(12) United States Patent
Waumans et al.

(10) Patent No.: US 9,829,784 B2
(45) Date of Patent: *Nov. 28, 2017

(54) COLOUR LASER MARKING

(71) Applicant: AGFA-GEVAERT, Mortsel (BE)

(72) Inventors: Bart Waumans, Mortsel (BE); Paul Callant, Mortsel (BE); Ingrid Geuens, Mortsel (BE); Bart Aerts, Mortsel (BE)

(73) Assignee: AGFA-GEVAERT, Mortsel (BE)

( * ) Notice: Subject to any disclaimer, the term of this patent is extended or adjusted under 35 U.S.C. 154(b) by 0 days.

This patent is subject to a terminal disclaimer.

(21) Appl. No.: 14/433,086

(22) PCT Filed: Oct. 10, 2013

(86) PCT No.: PCT/EP2013/071155
§ 371 (c)(1),
(2) Date: Apr. 2, 2015

(87) PCT Pub. No.: WO2014/057032
PCT Pub. Date: Apr. 17, 2014

(65) Prior Publication Data
US 2015/0277221 A1   Oct. 1, 2015

Related U.S. Application Data

(60) Provisional application No. 61/722,806, filed on Nov. 6, 2012.

(30) Foreign Application Priority Data

Oct. 11, 2012 (EP) .................................... 12188146

(51) Int. Cl.
*B41M 5/323* (2006.01)
*B41M 5/337* (2006.01)
(Continued)

(52) U.S. Cl.
CPC ................ *G03C 1/73* (2013.01); *B41J 2/442* (2013.01); *B41M 5/323* (2013.01);
(Continued)

(58) Field of Classification Search
None
See application file for complete search history.

(56) References Cited

U.S. PATENT DOCUMENTS

| 4,720,449 A | 1/1988 | Borror et al. |
| 5,948,600 A | 9/1999 | Roschger et al. |

(Continued)

FOREIGN PATENT DOCUMENTS

| DE | 199 57 001 A1 | 5/2001 |
| EP | 0 174 054 A2 | 3/1986 |

(Continued)

OTHER PUBLICATIONS

Fabian et al. "Near-Infrared absorbing dyes" Chem. Rev., vol. 92 (6) pp. 1197-1226 (1992).*

(Continued)

*Primary Examiner* — Martin Angebranndt
(74) *Attorney, Agent, or Firm* — Keating and Bennett, LLP

(57) ABSTRACT

A set of laminates includes an outer laminate and an inner laminate, wherein the outer laminate includes a transparent polymeric support including on a first side of the support a color laser markable layer containing an infrared dye having an absorption maximum $\lambda_{max}$(IR-1) in the infrared region; wherein the inner laminate includes a transparent polymeric support including on, a first side of the transparent polymeric support, a color laser markable layer containing an infrared dye having an absorption maximum $\lambda_{max}$(IR-2) in the infrared region and, on a second side of the transparent polymeric support, a color laser markable layer containing an infrared (Continued)

dye having an absorption maximum $\lambda_{max}(\text{IR-3})$ in the infrared region; and the conditions a) and b) are satisfied:

$$\lambda_{max}(\text{IR-1}) > \lambda_{max}(\text{IR-2}) > \lambda_{max}(\text{IR-3}); \text{ and} \quad \text{a)}$$

$$\lambda_{max}(\text{IR-1}) > 1100 \text{ nm and } \lambda_{max}(\text{IR-3}) < 1000 \text{ nm.} \quad \text{b)}$$

14 Claims, 2 Drawing Sheets

(51) Int. Cl.
- B41M 5/44 (2006.01)
- B41M 5/46 (2006.01)
- B41M 5/41 (2006.01)
- G03C 1/73 (2006.01)
- B41M 5/34 (2006.01)
- B41J 2/44 (2006.01)
- G03H 1/00 (2006.01)

(52) U.S. Cl.
CPC ............ *B41M 5/3372* (2013.01); *B41M 5/34* (2013.01); *B41M 5/41* (2013.01); *B41M 5/44* (2013.01); *B41M 5/465* (2013.01); *G03H 1/0011* (2013.01)

(56) References Cited

U.S. PATENT DOCUMENTS

| | | | |
|---|---|---|---|
| 2003/0124455 A1 | 7/2003 | Nakamura et al. | |
| 2004/0018355 A1* | 1/2004 | Shikano | B32B 7/02 428/323 |
| 2005/0225891 A1 | 10/2005 | Tsuboi et al. | |
| 2006/0147833 A1 | 7/2006 | Kasperchik et al. | |
| 2006/0232642 A1* | 10/2006 | Busch | B41J 2/355 347/76 |
| 2006/0276335 A1 | 12/2006 | Tsuboi et al. | |
| 2007/0211135 A1* | 9/2007 | Moreland | B41J 2/32 347/221 |
| 2007/0270310 A1* | 11/2007 | Blank | B41M 5/30 503/226 |
| 2012/0119171 A1 | 5/2012 | Ohashi et al. | |
| 2013/0229008 A1* | 9/2013 | Van Aert | B41M 3/142 283/75 |
| 2014/0232810 A1* | 8/2014 | Waumans | B41M 3/142 347/232 |
| 2015/0261080 A1* | 9/2015 | Callant | C09B 23/0075 430/363 |
| 2015/0277221 A1* | 10/2015 | Waumans | B41M 5/323 430/2 |
| 2015/0306887 A1* | 10/2015 | Waumans | B41J 2/435 347/102 |

FOREIGN PATENT DOCUMENTS

| | | |
|---|---|---|
| EP | 0 841 189 A1 | 5/1998 |
| EP | 1 093 015 A1 | 4/2001 |
| EP | 1 391 315 A2 | 2/2004 |
| EP | 1 466 728 A2 | 10/2004 |
| EP | 2 181 858 A1 | 5/2010 |
| EP | 2 463 096 A1 | 6/2012 |
| JP | 05-301448 * | 11/1993 |
| JP | 2000-238436 * | 9/2000 |
| JP | 2000-267265 A | 9/2000 |
| JP | 2002-023360 A | 1/2002 |
| JP | 2004-077613 A | 3/2004 |
| JP | 2008-088426 A | 4/2008 |

OTHER PUBLICATIONS

Official Communication issued in International Patent Application No. PCT/EP2013/071155, dated Dec. 9, 2013.
Callant et al., "Infrared Dyes for Laser Marking," U.S. Appl. No. 14/433,084, filed Apr. 2, 2015.
Callant et al., "Color Laser Marking," U.S. Appl. No. 14/433,085, filed Apr. 2, 2015.

* cited by examiner

COLOUR LASER MARKING

CROSS-REFERENCE TO RELATED APPLICATIONS

This application is a 371 National Stage Application of PCT/EP2013/071155, filed Oct. 10, 2013. This application claims the benefit of U.S. Provisional Application No. 61/722,806, filed Nov. 6, 2012, which is incorporated by reference herein in its entirety. In addition, this application claims the benefit of European Application No. 12188146.0, filed Oct. 11, 2012, which is also incorporated by reference herein in its entirety.

BACKGROUND OF THE INVENTION

1. Field of the Invention

This invention relates to colour laser marking of articles, especially security documents.

2. Description of the Related Art

Articles are laser marked in order to ensure product safety and authenticity. For example, packaging material of pharmaceuticals is laser marked to enable a consumer to verify the genuineness of a product. Laser marked security cards are widely used for various applications such as identification purposes (ID cards) and financial transfers (credit cards). Such cards typically consist of a laminated structure consisting of various papers or plastic laminates and layers wherein some of them may carry alphanumeric data and a picture of the card holder. So called 'smart cards' can also store digital information by including an electronic chip in the card body.

A principal objective of such articles and security cards is that they cannot be easily modified or reproduced in such a way that the modification or reproduction is difficult to distinguish from the original.

Two techniques frequently used for preparing security documents are laser marking and laser engraving. In literature, laser engraving is often incorrectly used for laser marking. In laser marking an article, a colour change is observed by local heating of material in the bulk of the article, while in laser engraving material is removed by ablation.

Today, laser marking employed in the manufacture of security documents consists solely of a "black" laser marking method via the carbonization of a polymer, usually polycarbonate as disclosed in e.g. EP 2181858 A (AGFA). There has been considerable interest in being able to produce multicolour images through laser marking.

EP 0174054 A (POLAROID) discloses a heat sensitive element used in a thermal imaging method for forming colour images which relies upon the irreversible unimolecular fragmentation of one or more thermally unstable carbamate moieties of an organic compound to effect a visually discernible colour shift from colourless to coloured, from coloured to colourless or from one colour to another. EP 0174054 A (POLAROID) suggests using infrared absorbers that absorb radiation at 760 nm, 820 nm and 880 nm.

U.S. Pat. No. 4,720,449 (POLAROID) discloses a thermal imaging method for producing colour images on a support carrying at least one layer of a colourless compound, such as di- or triarylmethane, by conversion of electromagnetic radiation into heat. The laser beams may have different wavelengths in a range above 700 nm with at least about 60 nm apart so that each imaging layer having a different infrared absorber may be exposed separately to convert a colourless triarylmethane compound into a coloured form. U.S. Pat. No. 4,720,449 (POLAROID) suggests infrared absorbers that absorb radiation at 760 nm, 820 nm and 1100 nm, and to use cyanine, merocyanine or thiopyrylium dyes that are substantially non-absorbing in the visible region of the electromagnetic spectrum so that it will not add any substantial amount of colour to $D_{min}$ areas, i.e. the highlight areas of an image. However, no examples of infrared dyes absorbing at 1100 nm are given.

In generating multicolour images with infrared lasers, so-called colour contamination or colour fogging may occur when the infrared absorption spectra overlap too much. Less overlap results in a larger achievable colour gamut. U.S. Pat. No. 4,720,449 (POLAROID) already disclosed that the infrared dyes should have absorption maxima that are at least about 60 nm apart. For a high colour gamut, it would be desirable to have larger gaps than 60 nm possible between the absorption maxima of the infrared dyes. However, there are two problems that limit the options for doing so.

A first problem is that dyes below about 830 nm still tend to absorb light in the visual spectrum from 400 to 700 nm, resulting e.g. in a white ID card have an annoying background discoloration.

A second problem is that, although lasers above 1100 nm are available, to the best of our knowledge infrared dyes with an absorption maximum above 1100 nm having minor or no absorption in the visual spectrum are not available or known.

DE 19957001 (FEW CHEMICALS), JP 2008088426 (NIPPON KAYAKU) and U.S. Pat. No. 5,948,600 (AGFA) disclose different types of infrared dyes having minor absorption in the visual spectrum for a method for forming a heat mode image from a reducible organic metal salt. However, no dyes with an absorption maximum above 1100 nm are disclosed.

US 2006276335 (SONY) discloses a reversible multicolour thermal recording medium capable of recording and erasing repeatedly high-contrast clear images free of colour fogging without causing colour deterioration. The reversible multicolour recording medium includes recording layers containing a light-heat converting composition which generates heat upon absorption of near infrared rays having absorption peak wavelengths in the near infrared region between 750 nm and 1500 nm. The examples show reversible multicolour thermal recording media using infrared dyes having an absorption maximum between 785 nm and 980 nm only. Furthermore, the fact that the multicolour thermal recording medium is reversible makes it unsuitable for purposes of ensuring product safety and authenticity.

US 2012119171 (SHINETSU CHEMICAL CO) discloses near-infrared absorbing dyes having a specific fluorinated anion for obtaining good solvent solubility. The dyes are advantageously used in a process of fabricating semiconductor devices. Paragraph [0111] states that the dyes absorb radiation in a wavelength range of 800 to 1200 nm but the application is silent on any wavelength of an infrared absorption maximum above 1100 nm.

It is common practice to combine different types of security features in order to increase the difficulty for falsifying a security document. Because colour laser markable layers are heat sensitive, the incorporation of some security features such as e.g. a hot stamp hologram may result in an undesired colour formation in the colour laser markable layers. One possibility would be increasing the number and the thickness of the heat insulating layers used in a colour laser markable material, such as exemplified in US 2006276335 (SONY). However, a security document is by ISO-standards usually limited to a maximum thickness, e.g. 0.76 mm for ID cards as specified in ISO 7813. This leads to less desirable compromises on the background discolouration level, the number and type of included security features and the thickness of the security document.

Hence, there is firstly a need for infrared dyes having minor absorption in the visual spectrum and a maximum absorption above 1100 nm, so that the infrared absorption peaks of the different infrared sensitive recording layers can be spaced well apart in order to realize a multicolour laser markable article having a high colour gamut and minor background discoloration. Furthermore, it is also desirable that other security features can be readily combined with colour laser markable layers in a security document without requiring extra measures due to the heat sensitivity of the colour laser markable layers.

SUMMARY OF THE INVENTION

In order to overcome the problems described above, preferred embodiments of the present invention provide a set of laminates as described below.

By using two laminates, a security feature can be manipulated prior to the assembly of the colour laser markable article. For example, a hot stamp hologram foil may first be fused onto the surface of an adhesive foil by heat and pressure, then interposed between the two colour laminates and all assembled with a white opaque core in a single hot lamination step.

In retrospect, a split up into a set of two colour laser markable laminates might appear a simple solution, but until now all multicolour laser markable articles were coated on a single polymeric support usually including one or more heat insulating layers. Furthermore, it was for preferred embodiments of the present invention also necessary to develop new infrared dyes having an infrared absorption maximum above 1100 nm, for producing multicolour laser marked security documents having reduced background discoloration and enhanced colour gamut.

Further advantages and preferred embodiments of the present invention will become apparent from the following description.

DETAILED DESCRIPTION OF THE PREFERRED EMBODIMENTS

Definitions

Figure 1:
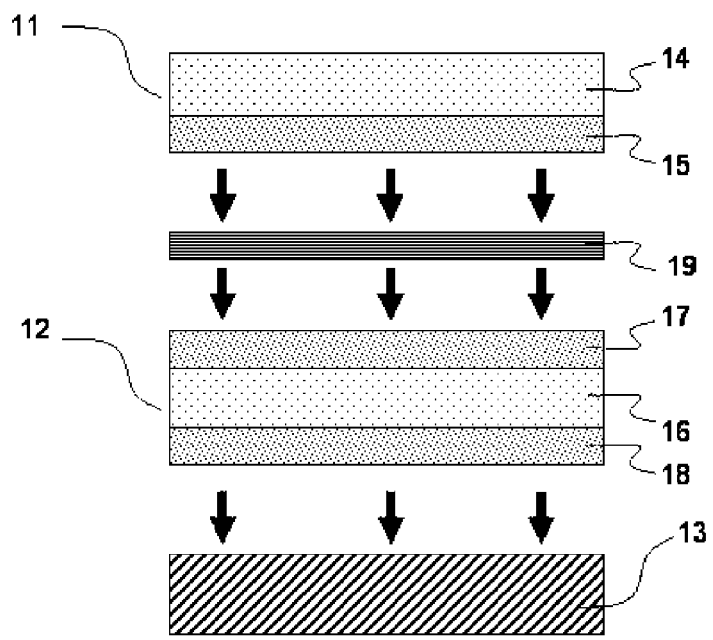
FIG. 1 shows a cross section of a preferred embodiment of a colour laser markable article wherein an outer laminate 11 including a transparent polymeric support 14 and a colour laser markable layer 15, an adhesive foil 19 which may carry a security feature (not shown), an inner laminate 12 including a transparent polymeric support 16 and two colour laser markable layers 17 and 18 are laminated onto a opaque core support 13. The end result is a three-colour asymmetrical laser markable article.
Figure 2:
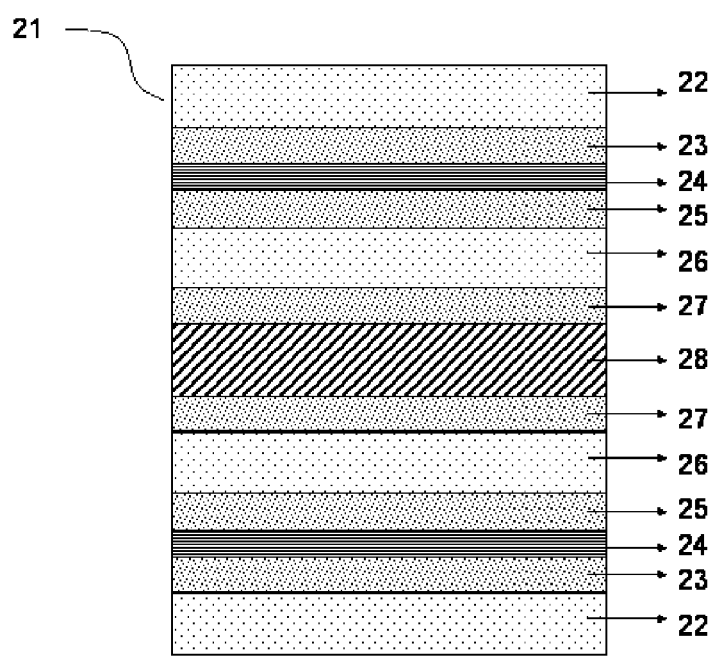
FIG. 2 shows a cross section of an preferred embodiment of a symmetrical colour laser markable article 21 including on both sides of an opaque core support 28, in order, a first colour laser markable layer 27, a transparent polymeric support 26, a second colour laser markable layer 25, an adhesive foil 24 with a security feature (not shown), a third colour laser markable layer 23 and a transparent polymeric support 22.

The terms "polymeric support" and "foil", as used herein, mean a self-supporting polymer-based sheet, which may be associated with one or more adhesion layers e.g. subbing layers. Supports and foils are usually manufactured through extrusion.

The term "layer", as used herein, is considered not to be self-supporting and is manufactured by coating it on a (polymeric) support or foil.

The term "leuco dye" as used herein refers to compounds which can change from essentially colourless to coloured when heated.

"PET" is an abbreviation for polyethylene terephthalate.

"PETG" is an abbreviation for polyethylene terephthalate glycol, the glycol indicating glycol modifiers which are incorporated to minimize brittleness and premature aging that occur if unmodified amorphous polyethylene terephthalate (APET) would be used in the production of cards.

"PET-C" is an abbreviation for crystalline PET, i.e. a biaxially stretched polyethylene terephthalate. Such a polyethylene terephthalate support has excellent properties of dimensional stability.

The definition of "security feature" corresponds with the normal definition as adhered to in the "Glossary of Security Documents—Security features and other related technical terms" as published by the Consilium of the Council of the European Union on Sep. 12, 2012 (Version: v. 09916-08.R.2.C.1.en) on its website: http://www.consilium.europa.eu/prado/EN/glossaryPop-up.html.

The term "alkyl" means all variants possible for each number of carbon atoms in the alkyl group i.e. methyl, ethyl, for three carbon atoms: n-propyl and isopropyl; for four carbon atoms: n-butyl, 1-isobutyl, 2-isobutyl and tertiary-butyl; for five carbon atoms: n-pentyl, 1,1-dimethyl-propyl, 2,2-dimethylpropyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_2$ to $C_6$-alkenyl group.

Unless otherwise specified a substituted or unsubstituted alkynyl group is preferably a $C_2$ to $C_6$-alkynyl group.

Unless otherwise specified a substituted or unsubstituted aralkyl group is preferably phenyl group or naphthyl group including one, two, three or more $C_1$ to $C_6$-alkyl groups.

Unless otherwise specified a substituted or unsubstituted alkaryl group is preferably a $C_1$ to $C_6$-alkyl group including an aryl group, preferably a phenyl group or naphthyl group.

Unless otherwise specified a substituted or unsubstituted aryl group is preferably a substituted or unsubstituted phenyl group or naphthyl group.

A cyclic group includes at least one ring structure and may be a monocyclic- or polycyclic group, meaning one or more rings fused together.

A heterocyclic group is a cyclic group that has atoms of at least two different elements as members of its ring(s). The counterparts of heterocyclic groups are homocyclic groups, the ring structures of which are made of carbon only. Unless otherwise specified a substituted or unsubstituted heterocyclic group is preferably a five- or six-membered ring substituted by one, two, three or four heteroatoms, preferably selected from oxygen atoms, nitrogen atoms, sulphur atoms, selenium atoms or combinations thereof.

An alicyclic group is a non-aromatic homocyclic group wherein the ring atoms consist of carbon atoms.

The term "heteroaryl group" means a monocyclic- or polycyclic aromatic ring comprising carbon atoms and one or more heteroatoms in the ring structure, preferably, 1 to 4 heteroatoms, independently selected from nitrogen, oxygen, selenium and sulphur. Preferred examples of heteroaryl groups include, but are not limited to, pyridinyl, pyridazinyl, pyrimidyl, pyrazyl, triazinyl, pyrrolyl, pyrazolyl, imidazolyl, (1,2,3,)- and (1,2,4)-triazolyl, pyrazinyl, pyrimidinyl, tetrazolyl, furyl, thienyl, isoxazolyl, thiazolyl, isoxazolyl, and oxazolyl. A heteroaryl group can be unsubstituted or substituted with one, two or more suitable substituents. Preferably, a heteroaryl group is a monocyclic ring, wherein the ring comprises 1 to 5 carbon atoms and 1 to 4 heteroatoms.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms Unless otherwise specified a substituted alkyl group, a substituted alkenyl group, a substituted alkynyl group, a substituted aralkyl group, a substituted alkaryl group, a substituted aryl, a substituted heteroaryl and a substituted heterocyclic group are preferably substituted by one or more substituents selected from the group consisting of methyl, ethyl, n-propyl, isopropyl, n-butyl, 1-isobutyl, 2-isobutyl and tertiary-butyl, ester, amide, ether, thioether, ketone, aldehyde, sulfoxide, sulfone, sulfonate ester, sulfonamide, —Cl, —Br, —I, —OH, —SH, —CN and —NO$_2$.

Laminate Sets and Colour Laser Markable Articles

A preferred embodiment of the present invention is a set of laminates including an outer laminate and an inner laminate, wherein the outer laminate includes a transparent polymeric support having on one side of the support a colour laser markable layer containing an infrared dye having an absorption maximum in the infrared region $\lambda_{max}$(IR-3); wherein the inner laminate includes a transparent polymeric support having on one side of the transparent polymeric support a colour laser markable layer containing an infrared dye having an absorption maximum in the infrared region $\lambda_{max}$(IR-2) and on the opposite side of the transparent polymeric support a colour laser markable layer containing an infrared dye having an absorption maximum in the infrared region $\lambda_{max}$(IR-1); and whereby the conditions a) and b) are fulfilled:

$\lambda_{max}$(IR-1)>$\lambda_{max}$(IR-2)>$\lambda_{max}$(IR-3); and  a)

$\lambda_{max}$(IR-1)>1100 nm and $\lambda_{max}$(IR-3)<1000 nm.  b)

In a more preferred embodiment of the set of laminates also the condition c) is fulfilled: c) $\lambda_{max}$(IR-2) differs by at least 70 nm from $\lambda_{max}$(IR-1) and $\lambda_{max}$(IR-3).

$\lambda_{max}$(IR) is the wavelength of the absorption maximum in the infrared spectrum from 700 to 1500 nm. The $\lambda_{max}$(IR-1), $\lambda_{max}$(IR-2) and $\lambda_{max}$(IR-3) are preferably measured by absorption spectroscopy on a coated layer, since the value of $\lambda_{max}$ may differ somewhat, although usually no more than 10 nm, on the type of solvent used in an infrared dye solution.

The transparent polymeric support of the outer laminate is preferably used as the outermost foil of a colour laser markable article for protecting the colour laser markable layer of the outer laminate against physical scratches and attempts of falsification if the colour laser markable article is e.g. an ID card. In addition, the transparent polymeric support of the outer laminate also protects the colour laser markable layers of the inner laminate present in the colour laser markable article.

A colour laser markable article preferably includes the set of laminates in such a way that the colour laser markable layers containing the infrared dyes having an absorption maximum in the infrared region $\lambda_{max}$(IR-3) and $\lambda_{max}$(IR-2) are facing each other. The advantage thereof is that colour contamination is prevented. In a different order, it was observed that, for example, the infrared laser used for colour laser marking the colour laser markable layer containing the infrared dye with $\lambda_{max}$(IR-2) also caused colour formation in the colour laser markable layer containing the infrared dye with $\lambda_{max}$(IR-1).

In a preferred embodiment of the colour laser markable article, an adhesive foil 19 is interlaminated between the inner and outer laminate. The major advantage of using a set of laminates in accordance with a preferred embodiment of the invention is that additional security features can easily be incorporated inside a colour laser markable article. In a more preferred embodiment, an adhesive foil including a security feature is interposed between the outer and inner laminates prior to simultaneous hot lamination in a colour laser markable article. Simultaneous hot lamination is not only advantageous for economic reasons but may also result in less background discoloration during the hot lamination process which usually involves temperatures above 100° C. for several minutes.

The adhesive foil 19 can be a hot melt foil that ensures adhesion between the colour laser markable laminates 11 and 12. Instead of an adhesive foil 19, alternatively an adhesive layer on one or both of the laser markable layers 15 and 17 can be used. Other possibilities for ensuring adhesion may be employed such as e.g. a transparent polymeric support having on both sides adhesive layers. However for certain applications like ID cards having a format as specified by ISO 7810, adhesive solutions having minimal thickness are preferred in order to allow the inclusion of further security features such as holograms and the like.

In a preferred embodiment, the colour laser markable article is a security document precursor having a format as specified by ISO 7810. ISO 7810 specifies three formats for identification documents: ID-1 with the dimensions 85.60 mm×53.98 mm, and a thickness of 0.76 mm as specified in ISO 7813, as used for bank cards, credit cards, driving licenses and smart cards; ID-2 with the dimensions 105 mm×74 mm, as used in German identity cards, with typically a thickness of 0.76 mm; and ID-3 with the dimensions 125 mm×88 mm, as used for passports and visa's. When the security cards include one or more contactless integrated circuits then a larger thickness is tolerated, e.g. 3 mm according to ISO 14443-1. In another preferred embodiment, the colour laser markable article is a security document precursor including electronic circuitry, more preferably the electronic circuitry includes a RFID chip with an antenna and/or a contact chip. Inclusion of electronic circuitry makes forgery more difficult.

The colour laser markable article is preferably used for manufacturing a security document, preferably a security document selected from the group consisting of a passport, a personal identification card and a product identification document. A product identification document is usually attached to packaging material of the product or to the product itself. The product identification document not only allows verifying the authenticity of the product, but also allows maintaining the attractive look of a product (packaging).

In a preferred embodiment, an infrared dye is used in the colour laser markable layer of the outer laminate which has an absorption maximum in the infrared region $\lambda_{max}(\text{IR-3})$ ≥830 nm, more preferably $\lambda_{max}(\text{IR-3})$≥850 nm and most preferably $\lambda_{max}(\text{IR-3})$≥890 nm. If the absorption maximum is smaller than 830 nm then usually the infrared dye also absorbs below 700 nm, which then leads to an undesired background discolouration.

In a preferred embodiment, an infrared dye is used in the colour laser markable layer of the inner laminate which has an absorption maximum in the infrared region $\lambda_{max}(\text{IR-1})$ ≥1125 nm, more preferably $\lambda_{max}(\text{IR-1})$≥1140 nm and most preferably $\lambda_{max}(\text{IR-1})$≥1150 nm. This allows selecting infrared lasers for the three colour laser markable layers that differ by more than 60 nm, more preferably by at least 80 nm, and most preferably by at least 90 nm from each other.

The set of laminates according to a preferred embodiment of the present invention includes three colour laser markable layers, but may include additional colour laser markable layers e.g. for producing a spot colour or further increasing the colour gamut. However since colour contamination can be effectively prevented using the set of laminates according to a preferred embodiment of the present invention, an appropriate selection of the colour forming compounds, preferably leuco dyes, in the colour laser markable layers allows to maximize the colour gamut without requiring additional colour laser markable layers.

In a preferred embodiment of the set of laminates, the three colour laser markable layers each include a different leuco dye for forming a colour having an absorption maximum $\lambda_{max}(\text{VIS-1})$, $\lambda_{max}(\text{VIS-2})$, respectively $\lambda_{max}(\text{VIS-3})$ in the visible spectrum of 400 nm to 700 nm, wherein all the relations a) to c) are fulfilled: a) 400 nm<$\lambda_{max}$(VIS-1)<500 nm; b) 500 nm<$\lambda_{max}$(VIS-2)<600 nm; and c) 600 nm<$\lambda_{max}$(VIS-3)<700 nm.

In a preferred embodiment, the colour laser markable article includes three colour laser markable layers on one side or on both sides of an opaque white core support. Preferably one of the three colour laser markable layers is capable of forming a cyan or blue colour image on laser marking, while the two other laser markable layers are capable of forming a magenta colour or a yellow colour respectively or otherwise capable of forming a red colour or a green colour respectively. The advantage is that readily available colour management systems for producing colour images based on either a CMY or RGB colour reproduction can be used.

In addition to the colours formed from the leuco dyes, it is preferred that the colour laser markable article is also capable of producing a black colour.

In a preferred embodiment, the black colour is produced by using the infrared laser, preferably the infrared laser used for the colour laser markable layer capable of forming a cyan or blue colour image on laser marking, in different laser operation modes as disclosed by WO 2012/076493 (AGFA). The advantage of using the infrared laser of the colour laser markable layer forming a cyan or blue colour image is that a neutral black colour is formed which is more appealing than a brownish black colour which would be formed on using the infrared laser for the colour laser markable layer capable of forming e.g. a yellow or a magenta colour image on laser marking.

In a more preferred embodiment, the colour laser markable article includes a laser markable polymeric support or a laser markable layer for generating a black colour as disclosed by EP 2463109 A (AGFA) also capable of producing different shades of black. The laser markable polymeric support for generating a black colour may be an additional foil or laminate, but is preferably the opaque core support or the transparent polymeric support of the inner or outer laminate, more preferably the inner laminate.

The colour laser markable article is preferably to a large degree symmetrical or more preferably completely symmetrical. Completely symmetrical means that the same type and number of layers and foils are present on both sides of the opaque core support. The advantage thereof is that curl of the colour laser markable article is minimized. An asymmetrical colour laser markable article often exhibits curl and usually requires a thermal relaxation in order to obtain e.g. a flat asymmetrical ID card.

Colour Laser Markable Layers

The colour laser markable layers in the set of laminates according to a preferred embodiment of the present invention contain an infrared dye for the conversion of electromagnetic radiation into heat when the colour laser markable layer is exposed by the infrared laser.

A colour laser markable layer includes preferably at least an infrared dye, a polymeric binder and a substantially colourless compound, preferably a leuco dye. Colour is produced in the colour laser markable layer by a chemical reaction converting the substantially colourless compound into a dye, wherein the chemical reaction is triggered by local heating with an infrared laser having an emission wavelength matching the absorption maximum of the infrared dye. Preferably, a laser emission wavelength is selected within a range of ±30 nm of the absorption maximum in the infrared region $\lambda_{max}(\text{IR})$ of the infrared dye.

The infrared dye not only delivers the heat for the colour forming action, but also has the advantage that there is no or minimal absorption in the visible spectrum and thus there is no or minimal interference with the colour formed by the laser markable layer. This makes a pure white background possible, which is often desired in e.g. a security document.

The colour laser markable layers can be coated onto a support by any conventional coating technique, such as dip coating, knife coating, extrusion coating, spin coating, slide hopper coating and curtain coating. Preferably the laser markable layer is coated with a slide hopper coater or a curtain coater, more preferably coated onto a transparent polymeric support including a subbing layer.

The dry thickness of the colour laser markable layer is preferably between 4 and 40 g/m$^2$, more preferably between 5 and 25 g/m$^2$, and most preferably between 6 and 15 g/m$^2$.

Transparent Polymeric Supports

The polymeric support of the inner and outer laminates in the set of laminates according to a preferred embodiment of the present invention are transparent for the light of the infrared lasers, but also for visual light so that the colour formed in the colour laser markable layers can be well observed.

The polymeric support for a laser markable layer is preferably a transparent (bi)axially stretched polymeric support, more preferably a transparent (bi)axially stretched polyester support, and most preferably a transparent (bi)axially stretched polyethylene terephthalate support.

The transparent polymeric support of the outer laminate is preferably selected from the group consisting of an axially stretched polyethylene terephthalate support, a biaxially stretched polyethylene terephthalate support, an axially stretched polyethylene naphtalate support and a biaxially stretched polyethylene naphtalate support.

In a very preferred embodiment of the set of laminates, at least the outer laminate includes a biaxially stretched polyethylene terephthalate support as transparent polymeric support.

The colour laser markable layer may be coated directly on the polymeric support or on a subbing layer provided on the polymeric support for improving adhesion of the laser markable layer, thereby making falsification through delamination more difficult.

Suitable polymeric supports include cellulose acetate propionate or cellulose acetate butyrate, polyesters such as polyethylene terephthalate and polyethylene naphtalate, polyamides, polycarbonates, polyimides, polyolefins, polyvinylchlorides, polyvinylacetals, polyethers and polysulphonamides.

In the most preferred embodiment, the transparent polymeric support is a biaxially stretched polyethylene terephthalate foil (PET-C foil) which is very durable and resistant to mechanical influences (flexion, torsion, scratches), chemical substances, moisture and temperature ranges. This is especially useful for security documents such as identification cards and credit cards for which the average daily usage has augmented substantially from less than 1 time per week to 4 times per day. The card body has to withstand not only this increased usage, but also the associated storage conditions. Cards are no longer safely tucked away in cabinets at home or seldom-opened wallets, but are now loosely put away in pockets, purses, sport bags etc.— ready for immediate use. PVC (polyvinylchloride) is the most widely used material for plastic cards but has low durability of the card body, resulting in an effective lifetime of only 1-3 years, much lower than the lifetime of the often expensive electronic chips included in the card. Other materials like Teslin™ and ABS are only suitable for very low-end or single-use cards. PC (polycarbonate) can be used for longer-life and more secure ID cards, but has a high production cost and a low resistance to torsion, scratching and chemicals.

The transparent polymeric support is preferably a single component extrudate, but may also be co-extrudate. Examples of suitable co-extrudates are PET/PETG and PET/PC (PC=polycarbonate).

Polyester supports and especially polyethylene terephthalate supports are preferred because of their excellent properties of dimensional stability. When polyester is used as the support material, a subbing layer is preferably employed to improve the bonding of layers, foils and/or laminates to the support.

The manufacturing of PET-C foils and supports is well-known to a person skilled in the art of preparing suitable supports for silver halide photographic films. For example, GB 811066 (ICI) teaches a process to produce biaxially oriented polyethylene terephthalate foils and supports.

The polyethylene terephthalate is preferably biaxially stretched with a stretching factor of at least 2.0, more preferably at least 3.0 and most preferably a stretching factor of about 3.5. The temperature used during stretching is preferably about 160° C.

Core Supports

The core support may be a transparent or translucent support, but is preferably an opaque core support, more preferably having a white or a pastel colour, most preferably a white colour, for allowing easily readable information or viewable colour image. The advantage of an opaque white core support is also that a colour image is more appealing since colours usually are more vibrant with a white background.

Preferred opaque white core supports include resin coated paper supports, such as polyethylene coated paper and polypropylene coated paper, and synthetic paper supports such as Synaps™ synthetic paper of Agfa-Gevaert NV.

Other examples of useful high-quality polymeric supports for a preferred embodiment of the present invention include opaque white polyesters and extrusion blends of polyethylene terephthalate and polypropylene. Also Teslin™ may be used as support.

Instead of a white support, a white opacifying layer can be coated onto a transparent polymeric support, such as those disclosed above. The opacifying layer preferably contains a white pigment with a refractive index greater than 1.60, preferably greater than 2.00, and most preferably greater than 2.60. The white pigments may be employed singly or in combination. Suitable white pigments include C.I. Pigment White 1, 3, 4, 5, 6, 7, 10, 11, 12, 14, 17, 18, 19, 21, 24, 25, 27, 28 and 32. Preferably titanium dioxide is used as pigment with a refractive index greater than 1.60. Titanium oxide occurs in the crystalline forms of anatase type, rutile type and brookite type. In a preferred embodiment of the present invention the rutile type is preferred because it has a very high refractive index, exhibiting a high covering power.

Methods to obtain opaque polyethylene terephthalate and biaxially oriented films thereof have been disclosed in, e.g. US 2008238086 (AGFA).

Subbing Layers

The transparent polymeric supports and opaque core support may be provided with one or more subbing layers. This has the advantage that the adhesion between the colour laser markable layer and the support is improved.

Useful subbing layers for this purpose are well known in the photographic art and include, for example, polymers of vinylidene chloride such as vinylidene chloride/acrylonitrile/acrylic acid terpolymers or vinylidene chloride/methyl acrylate/itaconic acid terpolymers.

The application of subbing layers is well-known in the art of manufacturing polyester supports for silver halide photographic films. For example, the preparation of such subbing layers is disclosed in U.S. Pat. No. 3,649,336 (AGFA), GB 1441591 (AGFA) and EP 2374602 A (AGFA).

Suitable vinylidene chloride copolymers include: the copolymer of vinylidene chloride, N-tert.-butylacrylamide, n-butyl acrylate, and N-vinyl pyrrolidone (e.g. 70:23:3:4), the copolymer of vinylidene chloride, N-tert.-butylacrylamide, n-butyl acrylate, and itaconic acid (e.g. 70:21:5:2), the copolymer of vinylidene chloride, N-tert.-butylacrylamide, and itaconic acid (e.g. 88:10:2), the copolymer of vinylidene chloride, n-butylmaleimide, and itaconic acid (e.g. 90:8:2), the copolymer of vinyl chloride, vinylidene chloride, and methacrylic acid (e.g. 65:30:5), the copolymer of vinylidene chloride, vinyl chloride, and itaconic acid (e.g. 70:26:4), the copolymer of vinyl chloride, n-butyl acrylate, and itaconic acid (e.g. 66:30:4), the copolymer of vinylidene chloride, n-butyl acrylate, and itaconic acid (e.g. 80:18:2), the copolymer of vinylidene chloride, methyl acrylate, and itaconic acid (e.g. 90:8:2), the copolymer of vinyl chloride, vinylidene chloride, N-tert.-butylacrylamide, and itaconic acid (e.g. 50:30:18:2). All the ratios given between brackets in the above-mentioned copolymers are ratios by weight.

In a preferred embodiment, the subbing layer has a dry thickness of no more than 2 μm or preferably no more than 200 mg/m$^2$.

Additional Layers

The inner and outer laminates and one or more of the colour laser markable layers may be coated by an additional layer. Such an additional layer can, for example, be an adhesive layer, a layer including UV stabilizers for protecting colour images against bleaching or a layer containing an infrared antihalation dye for improving the sharpness of a colour image.

Adhesive Foils

In one preferred embodiment, an adhesive is applied as a layer on top of a colour laser markable layer. However, the use of an adhesive foil instead of an adhesive layer has some advantages. A first advantage is that an adhesive foil does not extract some of the more soluble ingredients in the laser markable layer like an adhesive layer can do upon coating and drying. Variation in the concentration of the soluble ingredients leads to inconsistencies in the colour production during laser marking. A second advantage is that the same colour laser markable laminates can be combined with different types of security features interlaminated between two colour laser markable layers (e.g. 15 and 17 in FIG. 1) by selecting an appropriate adhesive foil for optimal adhesion depending on the type of security feature used.

Suitable adhesive foils include pressure-sensitive and thermo-sensitive adhesive foils. A range of so-called hot melt foils are well-known to one skilled in the art of security films and security documents.

A preferred hot melt foil in a preferred embodiment of the present invention is a polyurethane foil. Suitable commercially available hot melt foils include Platilon™ ID5051, a 35 µm polyurethane foil available from Epurex. Other suitable hot melt foils are Scapa™ Thermofoil G160 and G161.

Another preferred adhesive foil is PETG. Contrary to biaxially oriented polyethylene terephthalate, a non-oriented PETG foil softens rapidly near the glass transition temperature and can thus also be used for adhesive purposes.

In a preferred embodiment, the adhesive foil is made of a non-chlorinated polymer. Adhesive foils based on a chlorinated polymer may cause background discolouration. Preferred adhesive foils include polyester, polyester urethane, polyether urethane or polyolefin hot melt foils.

If the adhesive is applied as an adhesive layer on a colour laser markable layer or on polymeric support, this may be performed by methods such as solvent coating, casting, or hot melt extrusion.

Suitable thermo adhesive compositions are disclosed in WO 2009/063058 (AGFA). Preferred thermo adhesive layers are based on a hydroxyl-functional, partially-hydrolyzed vinyl chloride/vinyl acetate resin such as, for example, available under the trade name of UCAR™ VAGD Solution vinyl resin from Dow Chemical Company.

The adhesive foil preferably has a thickness smaller than 65 µm, more preferably smaller than 50 µm and most preferably smaller than 40 µm.

Polymeric Binders

The colour laser markable layers preferably include a polymeric binder. There is no real limitation on the type of polymeric binder for so far it allows colour formation.

Different types of polymeric binder may be used in the colour laser markable layers of the inner and outer laminates in the set of laminates according to a preferred embodiment of the present invention.

A particularly preferred binder is a copolymer including vinyl chloride and vinyl acetate, more preferably a polymeric binder comprising vinyl acetate and at least 85 wt % of vinyl chloride based on the total weight of the polymeric binder. Particularly preferred polymeric binders are disclosed in EP 2463110 A (AGFA).

The polymeric binder in the laser markable layer is preferably a copolymer including at least 85 wt % of a vinyl chloride and 1 wt % to 15 wt % of vinyl acetate, more preferably a copolymer including at least 90 wt % of a vinyl chloride and 1 wt % to 10 wt % of vinyl acetate with all wt % based on the total weight of the binder.

In a preferred embodiment, the polymeric binder includes at least 4 wt % of vinyl acetate based on the total weight of the binder. The advantage of having at least 4 wt % of vinyl acetate in the polymeric binder is that the solubility of the polymeric binder is drastically improved in desirable coating solvents like methyl ethyl ketone.

In a more preferred embodiment, the polymeric binder consists of vinyl chloride and vinyl acetate.

The polymeric binder is preferably present in the laser markable layer in an amount of 3 to 30 g/m², more preferably in an amount of 5 to 20 g/m².

Leuco Dyes

A leuco dye is a compound which can change from essentially colourless to coloured when heated, e.g. by laser marking. A number of classes of leuco dyes are preferred for the laser markable layer of a preferred embodiment of the present invention, for example: azines such as oxazines, diazines and thiazines; triarylmethanes such as fluoresceins, rhodamines and rhodols; ketazines; barbituric acid leuco dyes and thiobarbituric acid leuco dyes.

The leuco dye is preferably present in the laser markable layer in an amount of 0.01 to 2.0 g/m², more preferably in an amount of 0.1 to 1.0 g/m².

The following reaction mechanisms and leuco dyes are suitable to form a coloured dye.

1. Fragmentation of a Leuco Dye

The reaction mechanism can be represented by:

Leuco dye-FG→Dye wherein FG represents a fragmenting group.

A preferred leuco dye (CASRN104434-37-9) is shown in EP 174054 A (POLAROID) which discloses a thermal imaging method for forming colour images by the irreversible unimolecular fragmentation of one or more thermally unstable carbamate moieties of an organic compound to give a visually discernible colour shift from colourless to coloured.

The fragmentation of a leuco dye may be a two-step reaction mechanism represented by:

Leuco-dye-FG→[Leuco-dye]→Coloured Dye wherein FG represents a fragmenting group.

The fragmentation of a leuco dye may be catalyzed or amplified by acids and acid generating agents. The leuco dyes G-(1) to G-(17) disclosed by U.S. Pat. No. 6,100,009 (FUJI) are catalyzed or amplified by polymeric acid generating agents based on A-(1) to A-(52), which are also suitable as acid generating agents in the present invention.

2. Protonation of a Leuco Dye after Fragmentation of a H-Donor-Precursor

The reaction mechanism can be represented by:

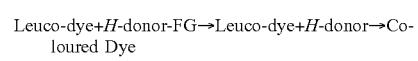
Leuco-dye+*H*-donor-FG→Leuco-dye+*H*-donor→Coloured Dye wherein FG represents a fragmenting group.

A preferred H-donor-FG compound includes an ester group as part of its chemical structure (the rest of the compound is represented by the group T) which by laser heating forms a carboxylic acid group:

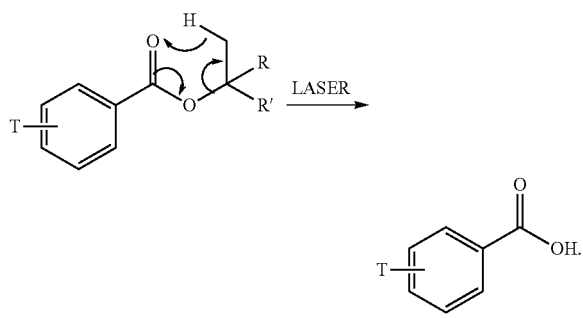

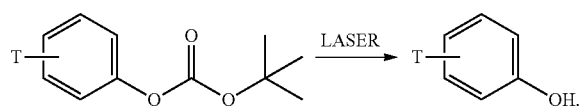

A more preferred H-donor-precursor includes a carbonate group, e.g. a tBOC group, as part of its chemical structure (the rest of the compound is represented by the group T) which by laser heating forms a phenol group:

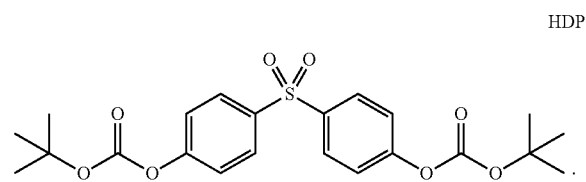 [SMILES: CC(C)(C)OC(=O)Oc1ccc(S(=O)(=O)c2ccc(OC(=O)OC(C)(C)C)cc2)cc1]

Preferred carbonate groups are given on page 8 of EP 605149 A (JUJO PAPER). In a preferred embodiment, the H-donor-FG compound contains 2 carbonate groups.

The most preferred H-donor-FG compound is:

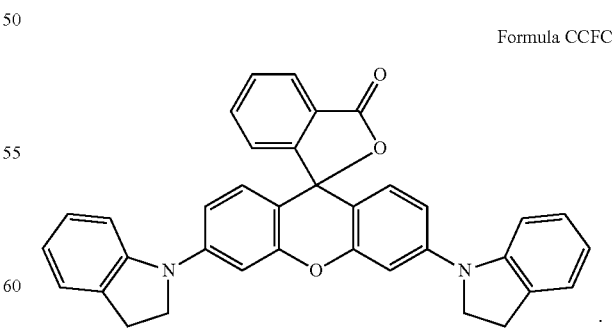

HDP

The synthesis of compound HDP (CASRN 129104-70-7) is given on page 31 of EP 605149 A (JUJO PAPER) for the compound (19).

In addition to the H-donor, the fragmentation of the H-donor-FG compound above also leads to the formation of a compound having a melting temperature lower than room temperature (20° C.). The formation of such a compound can be used as an additional security feature. After laser marking a laser markable article through a polymeric support, such as a biaxially stretched polyethylene terephthalate polymeric foil, the compound having a melting temperature lower than room temperature may disturb a second laser marking (falsification of a security document) by the formation of visible blisters.

3. Protonation of a Leuco Dye after a Re-Arrangement in a H-Donor-Precursor

The reaction mechanism can be represented by:

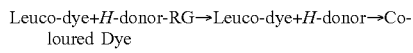

wherein RG represents a rearranging group.

A preferred H-donor-RG compound is capable of forming a compound having an allyl substituted phenol group as part of its chemical structure (the rest of the compound is represented by the group T) by laser heating:

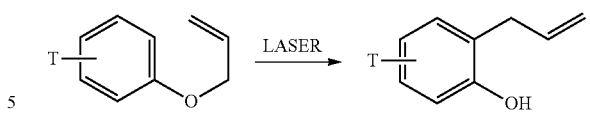

Preferred H-donor-RG compounds include 4,4'-diallyloxy diphenylsulfone whereof the synthesis is disclosed by EP 1452334 A (RICOH).

In contrast to the H-donor-FG compound of reaction mechanism 2, no compound having a melting temperature lower than room temperature (20° C.) is produced by the rearrangement of the H-donor-precursor to a hydrogen donor.

The colour formation according to the mechanisms 2 and 3 above are two-component reactions involving a leuco dye and a hydrogen donor-precursor, i.e. a 'H-donor-FG compound' or 'H-donor-RG compound', while the first reaction mechanism is an one-component reaction. The advantage of using a two-component reaction for the colour formation is that the stability, especially the shelf-life stability, can be enhanced. The probability of undesired colour formation due to environment heating is decreased by going from a single step reaction to a two step reaction involving the formation of the H-donor followed by a reaction of the formed H-donor with the leuco dye.

The preferred colour formation mechanism is the protonation of a leuco dye after fragmentation of the H-donor since it includes both advantages of the blister formation security feature and the enhanced shelf-life stability.

In a preferred embodiment of the colour laser markable layer, a combination is used of 4,4'-Bis(tert-butoxycarbonyloxy)diphenylsulfone (CASRN 129104-70-7) as the H-donor-FG compound with a leuco dye.

In a preferred embodiment of a colour laser markable layer for producing a blue colour, the blue colour forming compound is crystal violet lactone (CASRN 1552-42-7) for producing a blue colour.

In a preferred embodiment of a laser markable layer for producing a cyan colour, the cyan colour forming compound has a structure according to Formula CCFC:

Formula CCFC

In a preferred embodiment of a colour laser markable layer for producing a magenta colour, the magenta colour forming compound has a structure according to Formula MCFC:

Formula MCFC

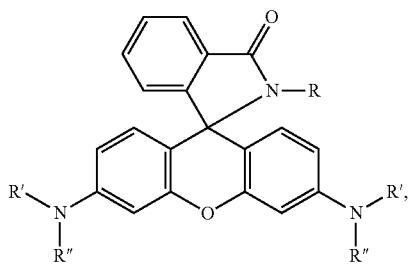

wherein R, R', R" are independently selected from the group consisting of hydrogen, a linear alkyl group, a branched alkyl group, an aryl and aralkyl group; or R' and R" are linked to form a heterocyclic ring.

In one preferred embodiment, the magenta colour forming compound has a structure according to Formula MCFC, the R, R', R" may independently represent a linear alkyl group, a branched alkyl group, an aryl or an aralkyl group substituted by at least one functional group containing an oxygen atom, a sulphur atom or a nitrogen atom.

Particularly preferred magenta colour forming compounds include the compounds M-1 to M-6 of Table 1

TABLE 1

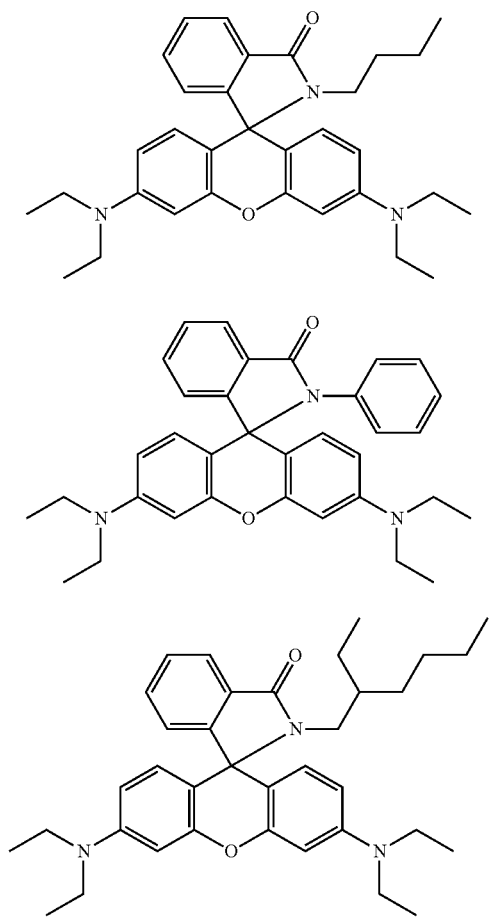

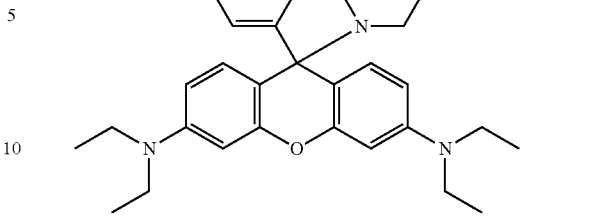

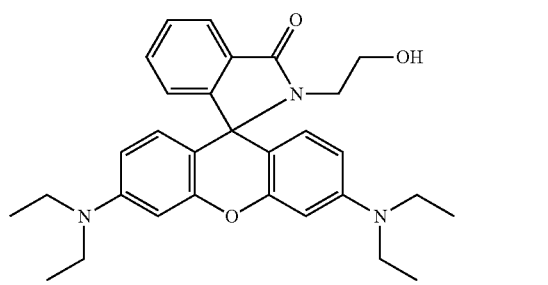 [SMILES: CCN(CC)c1ccc2c(c1)Oc1cc(N(CC)CC)ccc1C21c2ccccc2C(=O)N1CCO]

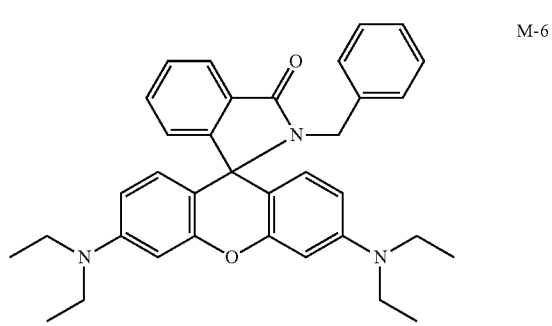

In a very preferred embodiment of a colour laser markable layer for producing a magenta colour, the magenta colour forming compound has a structure according to Formula MCFC2:

MCFC2

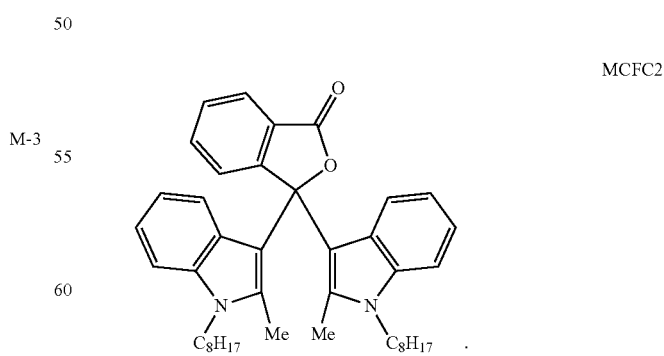

In a preferred embodiment of a colour laser markable layer for producing a red colour, the red colour forming compound has a structure according to Formula RCFC:

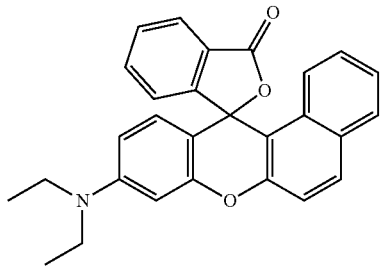

Formula RCFC

In a preferred embodiment of a colour laser markable layer for producing a yellow colour, the yellow colour forming compound has a structure according to Formula YCFC:

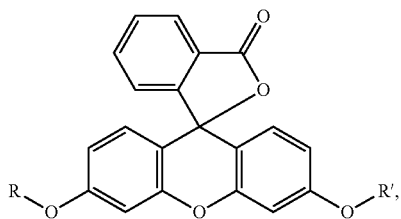

Formula YCFC wherein R, R' are independently selected from a group consisting of a linear alkyl group, a branched alkyl group, an aryl and aralkyl group.

In one preferred embodiment, the yellow colour forming compound has a structure according to Formula YCFC, wherein R and R' independently represent a linear alkyl group, a branched alkyl group, an aryl or an aralkyl group substituted by at least one functional group containing an oxygen atom, a sulphur atom or a nitrogen atom.

A particularly preferred yellow colour forming compound is the compound according to Formula YCFC wherein both R and R' are methyl.

Infrared Dyes

When multicoloured articles are desired, then the laser markable article includes a plurality of colour laser markable layers containing different infrared dyes and colour forming compounds. The infrared dyes differ in wavelength of maximum absorption $\lambda_{max}$ so that they can be addressed by different infrared lasers with corresponding emission wavelengths causing colour formation only in the colour laser markable layer of the addressed infrared dye.

The colour laser markable article according to a preferred embodiment of present invention preferably contains three or more colour laser markable layers having different infrared dyes and different leuco dyes on the same side of a core support for producing a multi-coloured article. The different infrared dyes have an absorption maximum in the infrared region which differs preferably by at least 60 nm, more preferably at least 80 nm and most preferably at least 90 nm.

Suitable examples of infrared dyes include, but are not limited to, polymethyl indoliums, metal complex IR dyes, indocyanine green, polymethine dyes, croconium dyes, cyanine dyes, merocyanine dyes, squarylium dyes, chalcogenopyryloarylidene dyes, metal thiolate complex dyes, bis(chalcogenopyrylo)polymethine dyes, oxyindolizine dyes, bis(aminoaryl)polymethine dyes, indolizine dyes, pyrylium dyes, quinoid dyes, quinone dyes, phthalocyanine dyes, naphthalocyanine dyes, azo dyes, (metalized) azomethine dyes and combinations thereof.

The infrared dye is preferably present in the colour forming layer in an amount of 0.01 to 1.0 g/m², more preferably in an amount of 0.02 to 0.5 g/m² and most preferably in an amount of 0.05 to 0.2 g/m². An amount of less than 0.01 g/m² requires a too high laser power and an amount of more than 0.5 g/m² may result in background discolouration.

Infrared Dyes with $\lambda_{max}$(IR-1)

In a preferred embodiment of a laser markable article producing multicoloured articles as e.g. shown in FIG. 1, the infrared dye having a absorption maximum of more than 1100 nm and included in the laser markable layer 18 is preferably an infrared dye having a chemical structure A-B-C consisting of a dye cation, wherein the nucleus group A of the dye cation is selected from NucA-1 to NucA-3:

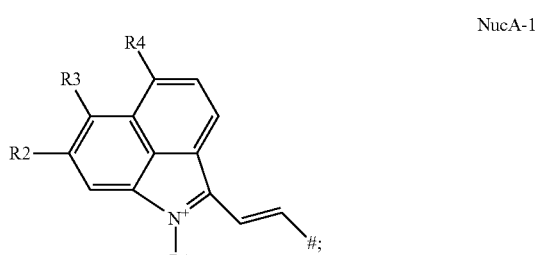

NucA-1

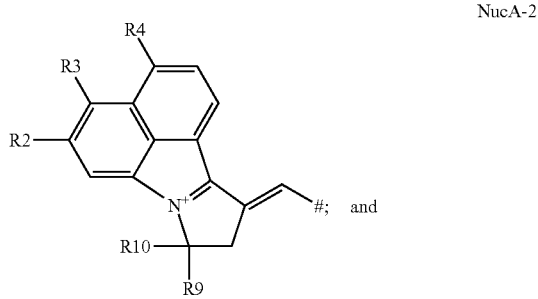

NucA-2

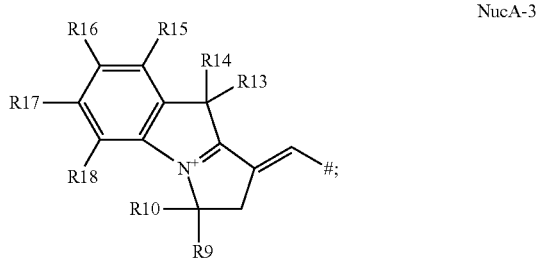

NucA-3 wherein the chain group B of the dye cation is selected from ChB-1 to ChB-9:

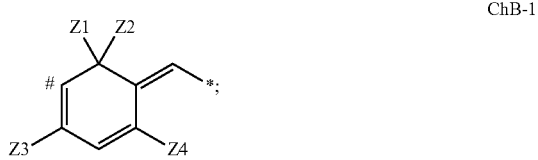

ChB-1

-continued

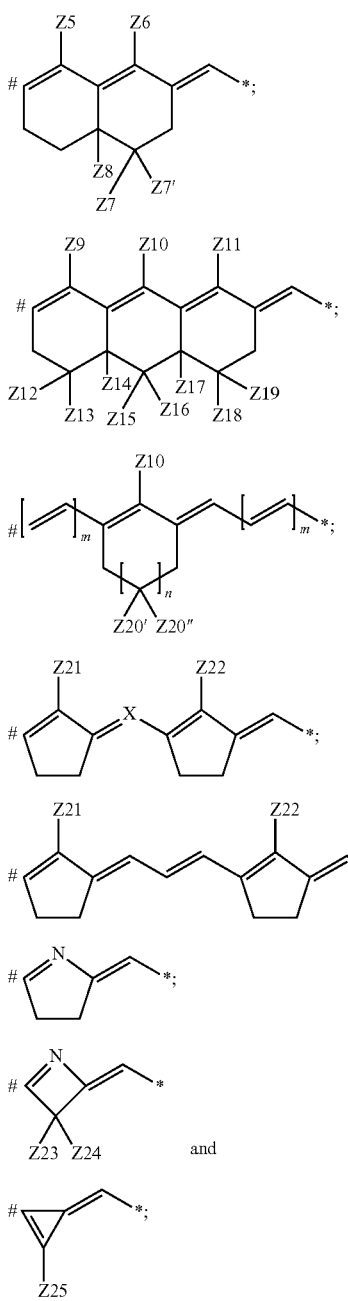

ChB-2
ChB-3
ChB-4
ChB-5
ChB-6
ChB-7
ChB-8
ChB-9 and wherein the nucleus group C of the dye cation is selected from NucC-1 to NucC-3:

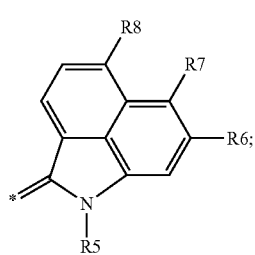

NucC-1

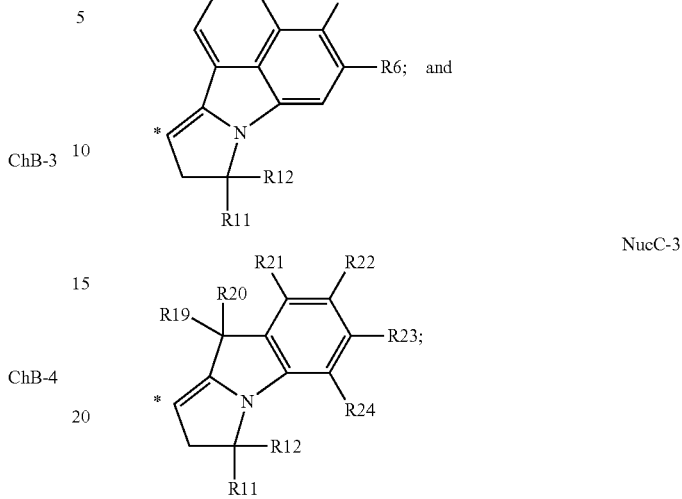

NucC-2

NucC-3 with # indicating the point of attachment between groups A and B;
with * indicating the point of attachment between groups B and C; and
wherein, R1 and R5 each independently represent an alkyl group having 1 to 10 carbon atoms; R3 and R7 each independently represent hydrogen, an alkoxy group having 1 to 10 carbon atoms; a thioalkyl group having 1 to 10 carbon atoms; a cyanide group; an ester group having 2 to 6 carbon atoms; an amide group having 3 to 6 carbon atoms; or a halogen;
R2, R4, R6 and R8 represent hydrogen; or R2 and R3 may represent the necessary atoms to form a five- or six-membered ring including an oxygen or nitrogen atom directly attached to the carbon atom carrying the R3 group; R4 and R3 may represent the necessary atoms to form a five- or six-membered ring including an oxygen or nitrogen atom directly attached to the carbon atom carrying the R3 group; R6 and R7 may represent the necessary atoms to form a five- or six-membered ring including an oxygen or nitrogen atom directly attached to the carbon atom carrying the R7 group; R8 and R7 may represent the necessary atoms to form a five- or six-membered ring including an oxygen or nitrogen atom directly attached to the carbon atom carrying the R7 group;
R9 to R12 each independently represent hydrogen or an alkyl group having 1 to 8 carbon atoms, or R9 and R10 and/or R11 and R12 may represent the necessary atoms to form an alicyclic five- or six-membered ring; R13, R14, R19, R20 each independently represent an alkyl group having 1 to 8 carbon atoms;
R15 to R18 each independently represent hydrogen or one of R15 and R16, R16 and R17 or R17 and R18 may represent the necessary atoms to form a benzene ring; R21 to R24 each independently represent hydrogen or one of R21 and R22, R22 and R23 or R23 and R24 may represent the necessary atoms to form a benzene ring; Z1 and Z2 each independently represent an alkyl group having 1 to 6 carbon atoms, a cyanide group, an ester group having 2 to 6 carbon atoms, an amide group having 3 to 6 carbon atoms, an alicyclic group having 5 to 14 carbon atoms, a heterocyclic group having 2 to 14 carbon atoms, an aryl group having 6 to 14 carbon atoms or a heteroaryl group having 2 to 14 carbon atoms; or Z1 and Z2 may represent the necessary atoms to form an alicyclic group having 5 to 14 carbon atoms or a heterocyclic group having 4 to 14 carbon atoms; Z3 to Z6 each independently represent hydrogen or halogen; Z7 and Z7' each independently represent hydrogen, an alkyl group having 1 to 6 carbon atoms, a cyanide group, an ester group having 2 to 6 carbon atoms, an amide group having 3 to 6 carbon atoms, an alicyclic group having 5 to 14 carbon atoms, a heterocyclic group having 2 to 14 carbon atoms, an aryl group having 6 to 14 carbon atoms or a heteroaryl group having 4 to 14 carbon atoms, or Z7 and Z7' may represent the necessary atoms to form an alicyclic group having 5 to 14 carbon atoms or a heterocyclic group having 4 to 14 carbon atoms; Z8 represents hydrogen or if at least one of Z7 and Z7' represents hydrogen Z8 may represent an alkyl group having 1 to 6 carbon atoms, a cyanide group, an ester group having 2 to 6 carbon atoms, an amide group having 1 to 6 carbon atoms or an aryl group having 6 to 14 carbon atoms; Z9, Z10 and Z11 each independently represent hydrogen or halogen; Z12 to Z19 each independently represent hydrogen, an alkyl group having 1 to 6 carbon atoms, an aryl group having 6 to 14 carbon atoms, or a heteroaryl group having 2 to 14 carbon atoms, a cyanide group, an ester group having 2 to 6 carbon atoms, an amide group having 3 to 6 carbon atoms or, one or more of Z12 and Z13, Z15 and Z16 and Z18 and Z19 may represent the necessary atoms to form an alicyclic group having 5 to 14 carbon atoms or a heterocyclic group having 4 to 14 carbon atoms; Z20 represents hydrogen, a halogen, a thioalkyl group having 1 to 8 carbon atoms, a thioaryl group having 5 to 14 carbon atoms, a thioheteroaryl group having 3 to 14 carbon atoms, an aryl group having 6 to 14 carbon atoms, a diarylamino group, an alkylsulfonyl group having 1 to 8 carbon atoms, an arylsulfonyl group having 6 to 14 carbon atoms or a heteroarylsulfonyl group having 2 to 14 carbon atoms; the integers m and n independently have a value of 0 or 1; Z20' and Z20'' each independently represent hydrogen, an alkyl group having 1 to 8 carbon atoms, a cyanide group, an ester group having 2 to 8 carbon atoms, an amide group having 3 to 8 carbon atoms or an aryl group having 6 to 14 carbon atoms or Z20' and Z20'' may represent the necessary atoms to form an alicyclic group having 5 to 14 carbon atoms or a heterocyclic group having 4 to 14 carbon atoms; Z21 and Z22 each independently represent hydrogen, halogen, a thioalkyl group having 1 to 8 carbon atoms or a thioaryl group having 5 to 14 carbon atoms; X represents nitrogen, a —CH-group or if both Z21 and Z22 represent hydrogen then X may represent a —CR-group with R representing an aryl group having 6 to 14 carbon atoms; Z23 and Z24 each independently represent an alkyl group having 1 to 8 carbon atoms, an aryl group having 6 to 14 carbon atoms or Z23 and Z24 may represent the necessary atoms to form a five- or six-membered ring; Z25 represents hydrogen or an aryl group; with the proviso that when the chain group ChB-4 with the integer m=0 is combined simultaneously with NucA-1 and NucC-1 that R3 and R6 do not represent hydrogen.

In the above description of the infrared # and * indicate the point of attachment between groups A and B, respectively the point of attachment between groups B and C. The concept of this is exemplified here below by Formula (I) for an infrared dye A-B-C having one anion A⁻ and a dye cation with NucA-1 as the nucleus group A, ChB-1 as the chain group B and NucC-1 as the nucleus group C:

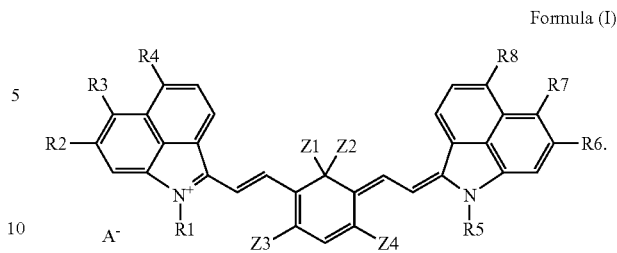

Formula (I)

The infrared dye has an absorption maximum in the infrared region $\lambda_{max}(IR)$ of larger than 1100 nm, preferably between 1125 nm and 1400 nm, more preferably between 1140 nm and 1300 nm, most preferably between 1150 nm and 1200 nm as measured by absorption spectroscopy in methylene chloride including $6.5 \times 10^{-6}$ wt % of methanesulfonic acid based on the total weight of methylenechloride.

In a preferred embodiment, the infrared dye having a dye cation with the A-B-C chemical structure includes as the nuclei A respectively C, one of the combinations NucA-1 and NucC-1, NucA-2 and NucC-2 and NucA-3 and NucC-3, more preferably one of the combination NucA-1 and NucC-1 and NucA-2 and NucC-2, and most preferably the combination NucA-2 and NucC-2.

In a particularly preferred embodiment, the infrared dye having a dye cation with the A-B-C chemical structure includes NucA-2 and NucC-2 as the nuclei A respectively C, and ChB-4 as the chain group, more preferably the chain group ChB-4 with Z20 representing a phenyl group, an alkylsulfonyl group containing 1 to 8 carbon atoms, an arylsulfonyl group containing 5 to 14 carbon atoms or a heteroarylsulfonyl group containing 5 to 14 carbon atoms, most preferably the integers m and n have a value of 0.

In a preferred embodiment of the infrared dye, the integer n has a value of 0, because it was observed that a larger background discolouration was obtained when the integer n has a value of 1.

In a preferred embodiment of the infrared dye, the integer m has a value of 0 for reasons of chemical stability In a preferred embodiment of the infrared dye, R1 and R5 each independently represent a branched alkyl group, more preferably a α-branched alkyl group and most preferably an asymmetrical α-branched alkyl group. It was observed that the solubility of the infrared dye drastically increases by using a branched alkyl group. The solubility of the infrared dye increases further from a branched alkyl group to an α-branched alkyl group to an asymmetrical α-branched alkyl group.

The meaning of an asymmetrical α-branched alkyl group is explained using the nucleus NucA-1 according to Formula (II):

Formula (II)

The first carbon atom of R1 attached to nitrogen in Formula (I) is the α-carbon atom where the branching of the alkyl group takes place in case of an α-branched alkyl group R1 having 1 to 10 carbon atoms. In an asymmetrical α-branched alkyl group, the groups $R^a$ and $R^b$ differ from each other.

The groups R1 and R5 in the nucleus NucA-1 respectively the nucleus NucC-1 are preferably represented by $CHR^aR^b$, wherein $R^a$ represents hydrogen or an alkyl group including 1 to 4 carbon atoms and $R^b$ represents an alkyl group including 1 to 9 carbon atoms, more preferably $R^a$ represents an alkyl group including 1 to 4 carbon atoms and $R^b$ represents an alkyl group including 1 to 8 carbon atoms, and even more preferably $R^a$ represents an alkyl group including 1 to 4 carbon atoms and $R^b$ represents an alkyl group including 2 to 8 carbon atoms, and most preferably the groups $R^a$ and $R^b$ differ from each other and $R^a$ represents an alkyl group including 1 to 4 carbon atoms and $R^b$ represents an alkyl group including 2 to 8 carbon atoms.

In a preferred embodiment of the infrared dye, R2, R4, R6 and R8 represent hydrogen, more preferably R2 to R4 and R6 to R8 all represent hydrogen.

In a preferred embodiment of the infrared dye, R2 to R4 and R6 to R8 all represent hydrogen and R1 and R5 each independently represent a branched alkyl group, more preferably an α-branched alkyl group and most an asymmetrical α-branched alkyl group.

In a preferred embodiment of the infrared dye, R9 to R12 each independently represent an alkyl group having 1 to 8 carbon atoms.

In a preferred embodiment of the infrared dye, R15 to R18 each independently represent hydrogen or one of R15 and R16, R16 and R17 or R17 and R18 represent the necessary atoms to form an unsubstituted benzene ring.

In a preferred embodiment of the infrared dye, R21 to R24 each independently represent hydrogen or one of R21 and R22, R22 and R23 or R23 and R24 represent the necessary atoms to form an unsubstituted benzene ring.

In a preferred embodiment, the infrared dye having a dye cation with the A-B-C chemical structure includes a chain group B selected from the group consisting of ChB-1 to ChB-6.

In a particularly preferred embodiment, the infrared dye having a dye cation with the A-B-C chemical structure includes NucA-1 and NucC-1 as the nuclei A respectively C, and ChB-4 as the chain group, more preferably the chain group ChB-4 with Z20 representing a phenyl group, a diphenylamino group, an alkylsulfonyl group containing 1 to 8 carbon atoms, an arylsulfonyl group containing 6 to 14 carbon atoms or a heteroarylsulfonyl group containing 2 to 14 carbon atoms, even more preferably the chain group ChB-4 with Z20 representing a phenylsulfonyl group, a para-nitrophenylsulfonyl group, a para-alkoxyphenylsulfonyl group wherein the alkoxy group contains 1 to 6 carbon atoms or a para-chlorophenylsulfonyl group, and most preferably the integers m and n have a value of 0.

In a preferred embodiment of the infrared dye, Z1 and Z2 represent a cyclic group selected from the group consisting of a cyclopentane-1,3-dione group and a barbituric acid group, preferably a barbituric acid group wherein the nitrogen atoms are substituted by an alkyl group, an aryl group, an alkaryl group or an aralkyl group.

In a preferred embodiment of the infrared dye, Z3 and Z4 represent hydrogen or chlorine, more preferably hydrogen.

In a preferred embodiment of the infrared dye, Z3 and Z4 each independently represent hydrogen or chlorine, more preferably Z3 and Z4 represent hydrogen or chlorine, and most preferably Z3 and Z4 represent hydrogen.

In a preferred embodiment of the infrared dye, Z5 and Z6 each independently represent hydrogen or chlorine, more preferably at least one of Z5 and Z6 represents chlorine.

In a preferred embodiment of the infrared dye, Z7 and Z7' represent the necessary atoms for forming a preferably a barbituric acid group wherein the nitrogen atoms are substituted by an alkyl group, an aryl group, an alkaryl group or an aralkyl group.

In a particularly preferred embodiment of the infrared dye, Z5 represents chlorine; Z6 represents hydrogen; and Z7 and Z7' represent the necessary atoms for forming a preferably a barbituric acid group wherein the nitrogen atoms are substituted by an alkyl group, an aryl group, an alkaryl group or an aralkyl group.

In a preferred embodiment of the infrared dye, Z9 to Z11 all represent hydrogen or one or two of Z9 to Z10 represents chlorine.

In one preferred embodiment of the infrared dye, Z12 to Z19 all represent hydrogen.

In one preferred embodiment of the infrared dye, Z20, Z21 and Z22 all represent chlorine.

In another preferred embodiment, Z20 represents a phenyl group, a diphenylamino group, an alkylsulfonyl group containing 1 to 8 carbon atoms, an arylsulfonyl group containing 6 to 14 carbon atoms or a heteroarylsulfonyl group containing 6 to 14 carbon atoms, more preferably Z20 represents a phenylsulfonyl group, a para-nitrophenylsulfonyl group, a para alkoxyphenylsulfonyl group wherein the alkoxy group contains 1 to 6 carbon atoms or a parachlorophenylsulfonyl group, and most preferably the integers m and n have a value of 0.

In a preferred embodiment of the infrared dye, Z21 and Z22 each independently represent hydrogen or halogen, more preferably hydrogen.

In a preferred embodiment of the infrared dye, X represents nitrogen or a —CH-group, more preferably a —CH-group.

In a preferred embodiment of the infrared dye, Z23 and Z24 both represent a methyl group or ethyl group, more preferably Z23 and Z24 both represent a methyl group.

In a preferred embodiment of the infrared dye, Z1 and Z2 represent a cyclic group selected from the group consisting of a cyclopentane-1,3-dione group and a barbituric acid group wherein the nitrogen atoms are substituted by an alkyl group, an aryl group, an alkaryl group or an aralkyl group; Z3 and Z4 represent hydrogen; Z5 and Z6 each independently represent hydrogen or chlorine, more preferably at least one of Z5 and Z6 represents chlorine; Z7 and Z7' represent the necessary atoms for forming a barbituric acid group, preferably a barbituric acid group wherein the nitrogen atoms are substituted by an alkyl group, an aryl group, an alkaryl group or an aralkyl group; Z9 to Z11 all represent hydrogen; Z12 to Z19 all represent hydrogen; and Z20 to Z22 all represent chlorine.

In a preferred embodiment of the infrared dye, the anion to compensate the charge of the dye cation is selected from the group consisting of chloride, bromide and iodide ions, fluoroalkylsulfonates, arylsulfonates and alkylsulfonates.

In a more preferred embodiment of the infrared dye, the anion to compensate the charge of the dye cation is selected from the group consisting of a chloride ion, triflate, 1,1,1-trifluoroethanesulfonate, pentafluoroethanesulfonate, nonafluorobutanesulfonate, tosylate, benzenesulfonate, 4-fluorobenzenesulfonate, 1,2,3,4,5-pentafluorobenzenesulfonate, mesylate and butanesulfonate.

In a preferred embodiment of the infrared dye, the anion to compensate the charge of the dye cation is a non-fluorinated anion. The advantage is that the infrared dyes could be prepared lacking fluorinated anions to compensate the charge of the dye cation without causing problems of dye solubility in an apolar medium or having ecologically undesirable fluorinated waste in the synthesis of the infrared dyes. This is especially the case for the infrared dyes having a dye cation with the A-B-C chemical structure including NucA-1 and NucC-1 as the nuclei A respectively C, wherein R1 and R5 each independently represent a branched alkyl group, more preferably an α-branched alkyl group and most preferably an asymmetrical α-branched alkyl group.

In a particularly preferred embodiment, the infrared dye having a dye cation with the A-B-C chemical structure includes a non-fluorinated anion to compensate the charge of the dye cation having NucA-1 and NucC-1 as the nuclei A respectively C, wherein R1 and R5 each independently represent a branched alkyl group, more preferably an α-branched alkyl group and most preferably an asymmetrical α-branched alkyl group; and ChB-4 as the chain group, more preferably the chain group ChB-4 with Z20 representing an alkylsulfonyl group containing 1 to 8 carbon atoms, an arylsulfonyl group containing 6 to 14 carbon atoms or a heteroarylsulfonyl group containing 6 to 14 carbon atoms, most preferably the chain group ChB-4 with Z20 representing a phenylsulfonyl group, a para-nitrophenylsulfonyl group, a para alkoxyphenylsulfonyl group wherein the alkoxy group contains 1 to 6 carbon atoms or a parachlorophenylsulfonyl group.

Preferred nucleus groups A are shown in Table 2 without being limited thereto.

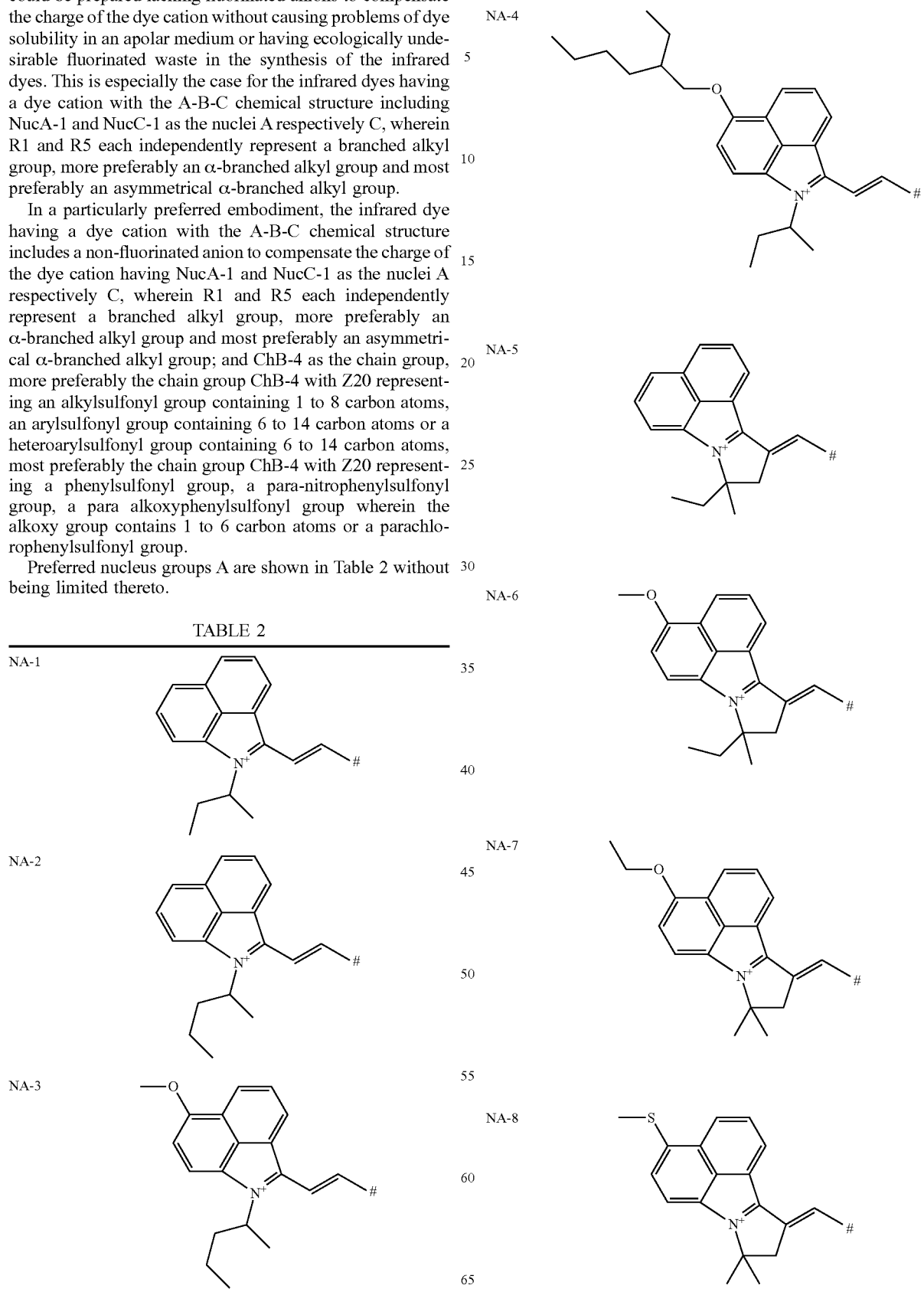

TABLE 2

TABLE 2-continued
NA-9 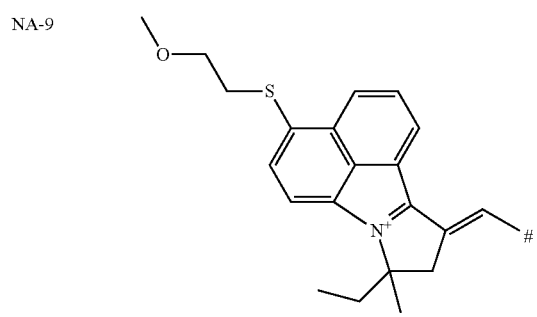
NA-10 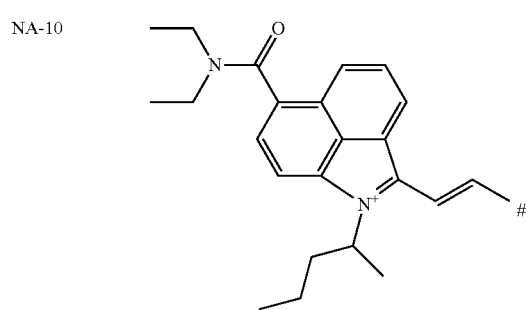
NA-11 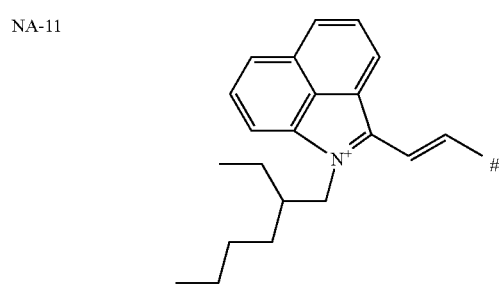
NA-12 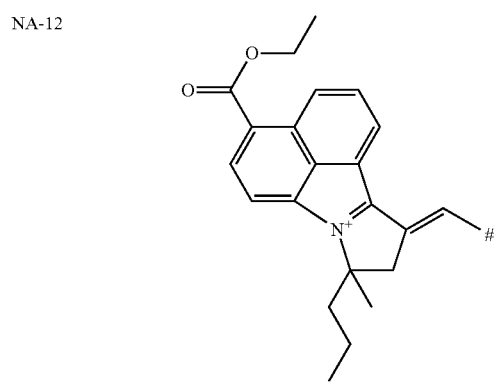
NA-13 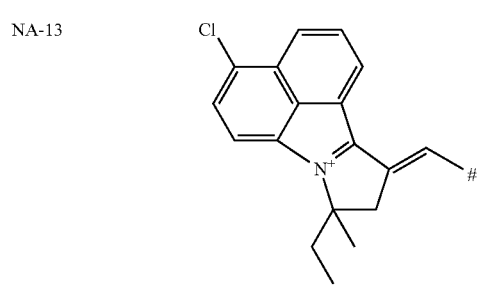
TABLE 2-continued
NA-14 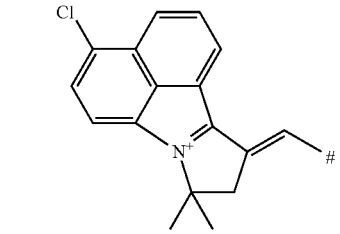 [SMILES: C/C=C1\CC(C)(C)[N+]2=C1c1cccc3c(Cl)ccc2c13]
NA-15 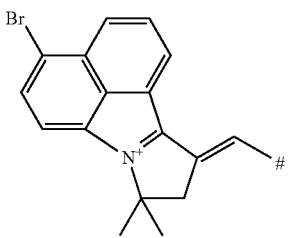
NA-16 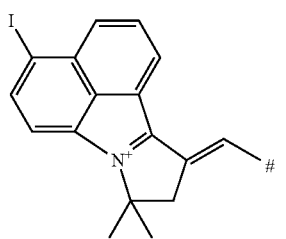 [SMILES: C/C=C1\CC(C)(C)[N+]2=C1c1cccc3c(I)ccc2c13]
NA-17 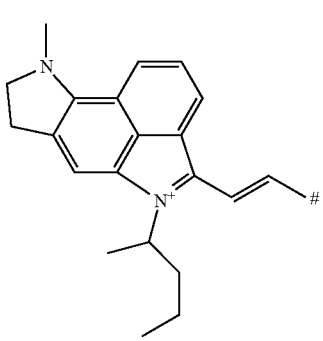 [SMILES: C/C=C/C1=[N+](C(C)CCC)c2cc3c(c4cccc1c24)N(C)CC3]
NA-18 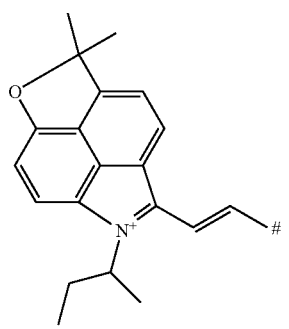 [SMILES: C/C=C/C1=[N+](C(C)CC)c2ccc3c4c(ccc1c24)C(C)(C)O3]

TABLE 2-continued
NA-19 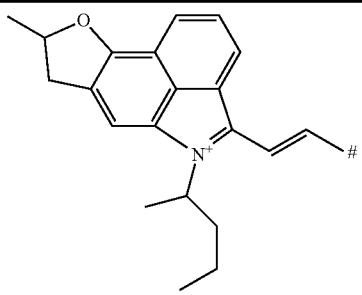
NA-20 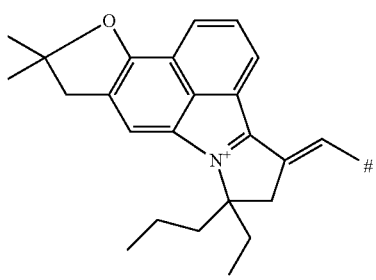 [SMILES: C/C=C1\CC(CC)(CCC)[N+]2=C1c1cccc3c4c(cc2c13)CC(C)(C)O4]
NA-21 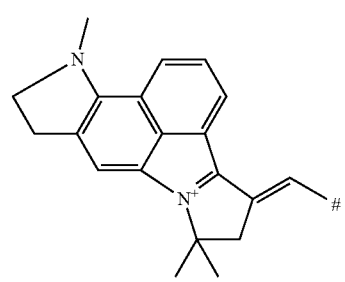 [SMILES: C/C=C1\CC(C)(C)[N+]2=C1c1cccc3c4c(cc2c13)CCN4C]
NA-22 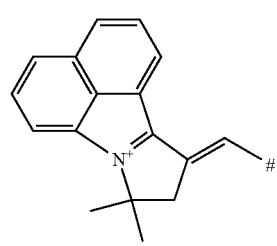 [SMILES: C/C=C1\CC(C)(C)[N+]2=C1c1cccc3cccc2c13]
NA-23 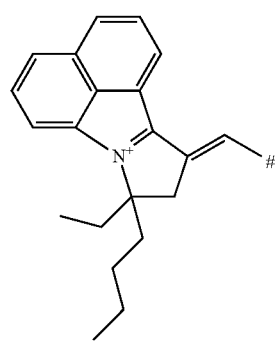 [SMILES: C/C=C1\CC(CC)(CCCC)[N+]2=C1c1cccc3cccc2c13]
NA-24 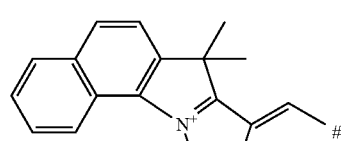
TABLE 3
CB-1 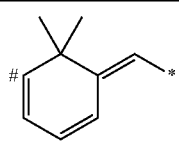
CB-2 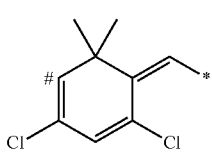 [SMILES: */C=C1\C(Cl)=CC(Cl)=CC1(C)C]
CB-3 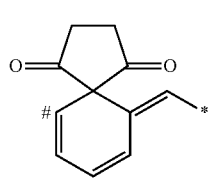
CB-4 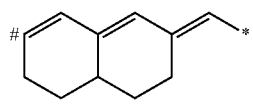 [SMILES: */C=C1/C=C2C=CCCC2CC1]
CB-5 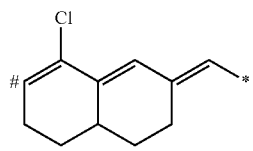 [SMILES: */C=C1/C=C2C(Cl)=CCCC2CC1]
CB-6 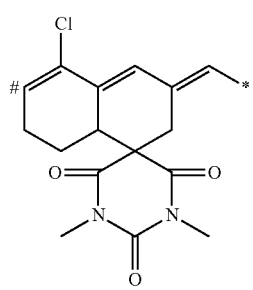 [SMILES: */C=C1/C=C2C(Cl)=CCCC2C2(C1)C(=O)N(C)C(=O)N(C)C2=O]
CB-7 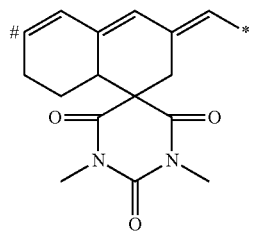 [SMILES: */C=C1/C=C2C=CCCC2C2(C1)C(=O)N(C)C(=O)N(C)C2=O]
CB-8 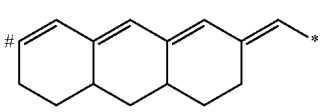 [SMILES: */C=C1/C=C2C=C3C=CCCC3CC2CC1]
CB-9 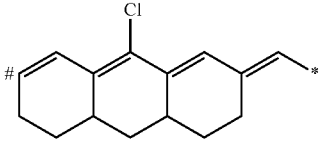 [SMILES: */C=C1/C=C2C(Cl)=C3C=CCCC3CC2CC1]
Preferred chain groups B are shown in Table 3 without being limited thereto.

TABLE 3-continued
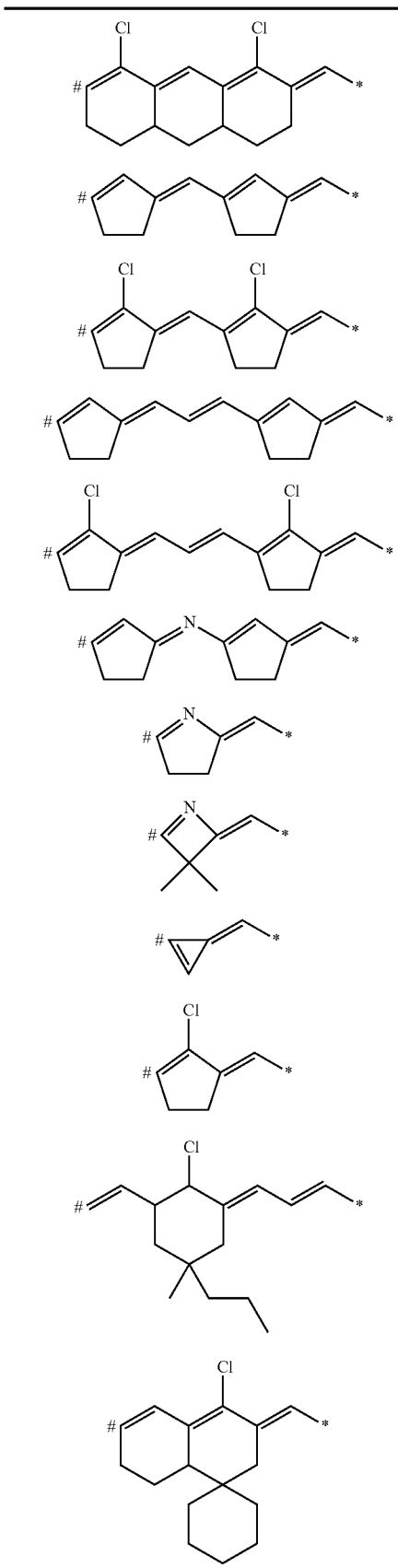
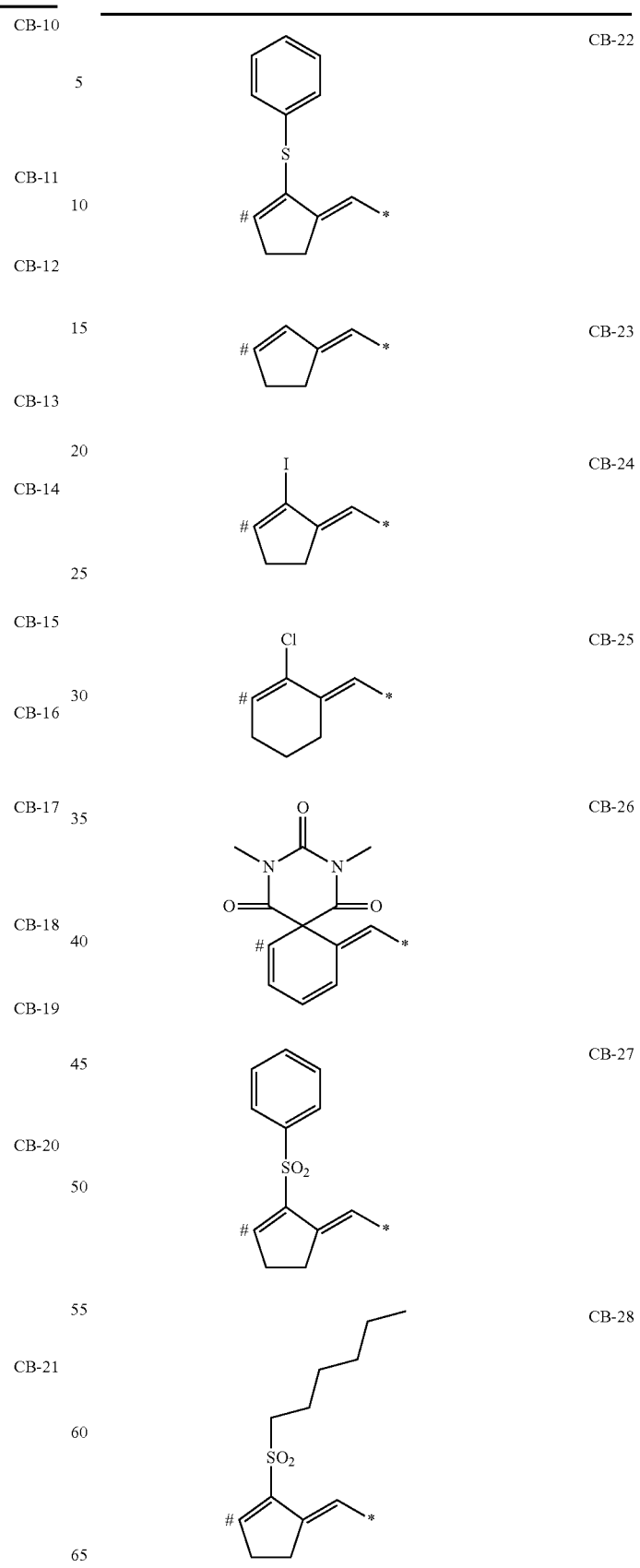

TABLE 3-continued
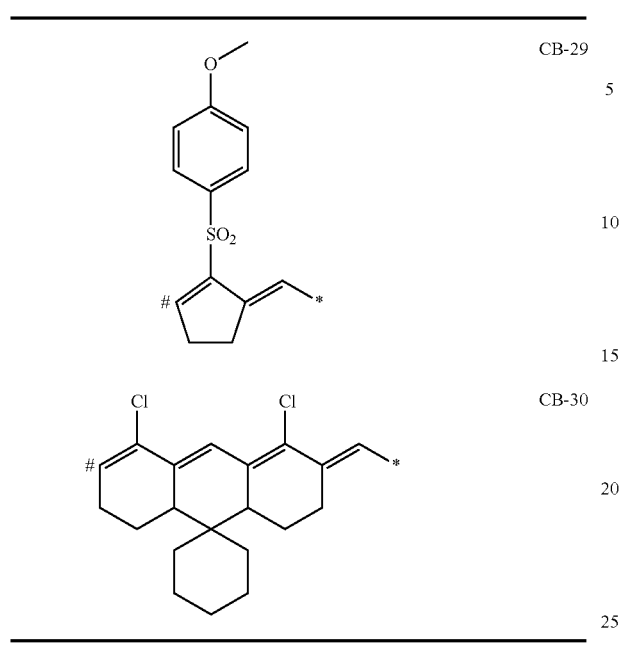
Preferred nucleus groups C are shown in Table 4 without being limited thereto.
TABLE 4
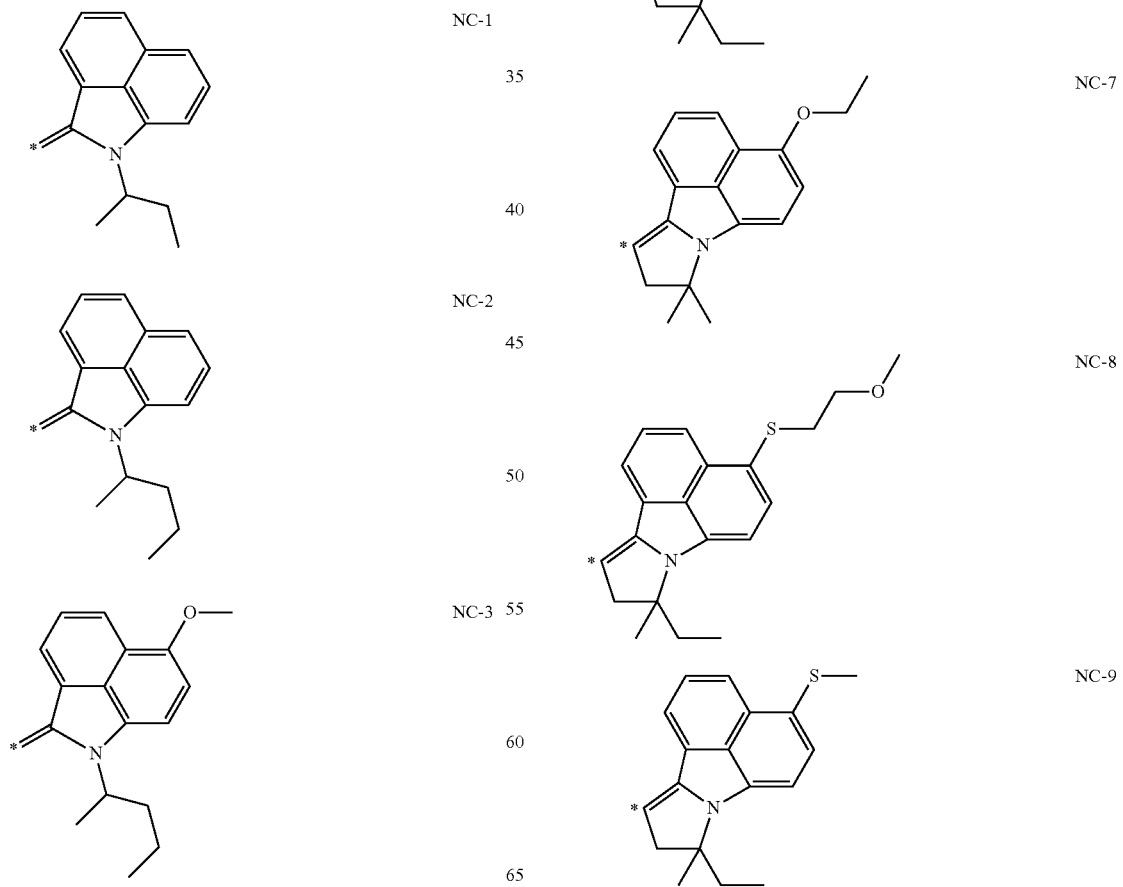

TABLE 4-continued
| | |
|---|---|
| 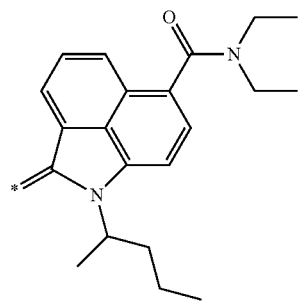 [SMILES: *=c1c2cccc3c(C(=O)N(CC)CC)ccc(c32)n1C(C)CCC] NC-10 | 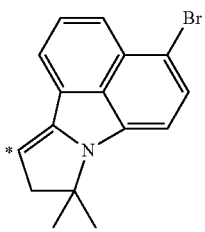 NC-15 |
| 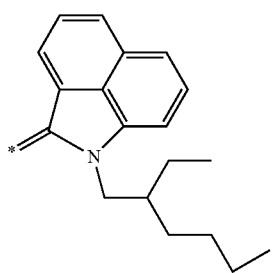 [SMILES: *=c1c2cccc3cccc(c32)n1CC(CC)CCCC] NC-11 | 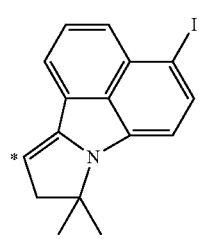 NC-16 |
| 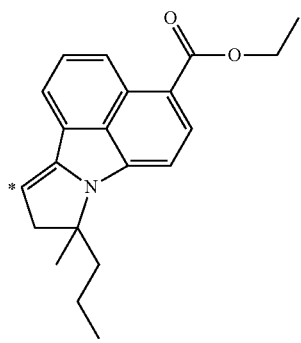 [SMILES: CCCC1(C)CC=c2c3cccc4c(C(=O)OCC)ccc(c43)n21] NC-12 | 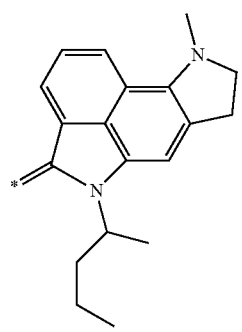 NC-17 |
| 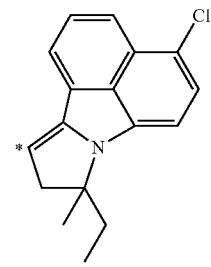 [SMILES: CCC1(C)CC=c2c3cccc4c(Cl)ccc(c43)n21] NC-13 | 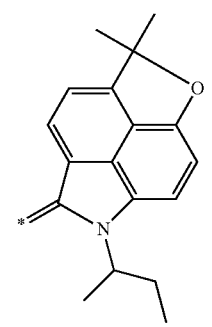 NC-18 |
| 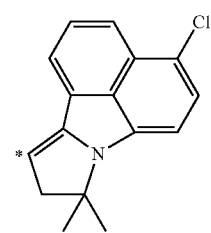 [SMILES: CC1(C)CC=c2c3cccc4c(Cl)ccc(c43)n21] NC-14 | 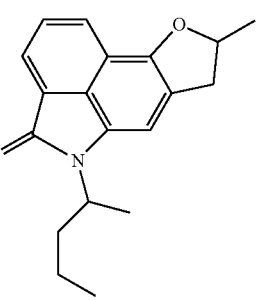 NC-19 |

TABLE 4-continued

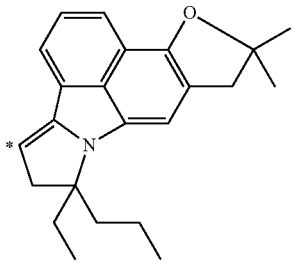 [SMILES: CCCC1(CC)CC=c2c3cccc4c5c(cc(c43)n21)CC(C)(C)O5]
NC-20

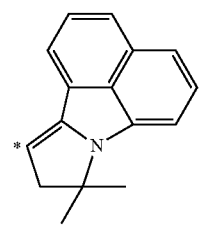 [SMILES: CC1(C)CC=c2c3cccc4cccc(c43)n21]
NC-21

NC-22

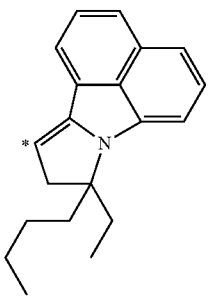 [SMILES: CCCCC1(CC)CC=c2c3cccc4cccc(c43)n21]
NC-23

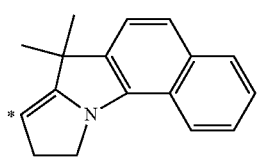 [SMILES: CC1(C)C2=CCCN2c2c1ccc1ccccc21]
NC-24

The synthesis of the infrared dye having a chemical structure A-B-C is well-known a person skilled in the art of synthesizing dyes. For the sake of clarity, the method of synthesis is exemplified in Example 1 here below.

Infrared Dyes with $\lambda_{max}$(IR-2)

In a preferred embodiment of a laser markable article producing multicoloured articles as e.g. shown in FIG. 1, the infrared dye having a absorption maximum between 1000 nm and 1100 nm and included in the laser markable layer 17 is preferably an infrared dye selected from the group consisting of quinoline dyes, indolenine dyes, especially a benzo[cd]indoline dye. A particular preferred infrared dye is 5-[2,5-bis[2-[1-(1-methylbutyl)benz[cd]indol-2(1H)-ylidene]ethylidene]cyclopentylidene]-1-butyl-3-(2-methoxy-1-methylethyl)-2,4,6(1H,3H,5H)-pyrimidinetrione (CASRN 223717-84-8), which has an absorption maximum $\lambda_{max}$ of 1052 nm making it very suitable for a Nd-YAG laser having an emission wavelength of 1064 nm.

Infrared Dyes with $\lambda_{max}$(IR-3)

In a preferred embodiment of a laser markable article producing multicoloured articles as e.g. shown in FIG. 1, the infrared dye having a absorption maximum between 830 nm and 1000 nm and included in the laser markable layer 15 is preferably an infrared dye selected from the group consisting of quinoline dyes, indolenine dyes, especially benzo[e]indolenine dyes, and benzo[f]indolenine dyes.

Thermal Acid Generating Compounds

The fragmentation of a leuco dye in a colour laser markable layer may be catalyzed or amplified by acids and acid generating agents.

Suitable thermal acid generating agents may be the polymeric acid generating agents based on the ethylenically unsaturated polymerizable compounds A-(1) to A-(52) disclosed by U.S. Pat. No. 6,100,009 (FUJI).

Suitable non-polymeric acid generating agents are the compounds E-(1) to E-(90) disclosed by U.S. Pat. No. 6,100,009 (FUJI) lacking the ethylenically unsaturated polymerizable group.

The thermal acid generating agent is preferably present in the amount of 1 to 20 wt %, more preferably 5 to 15 wt % based on the total dry weight of the colour laser markable layer.

Stabilizers

A colour laser markable layer, preferably the colour laser markable layer of the outer laminate, includes in a preferred embodiment according to the present invention at least one stabilizer, preferably a UV stabilizer.

Suitable commercially available stabilizers include 6-O-palmitoyl-L-ascorbic acid (CASRN137-66-6) from BASF; TOCOBLEND™ L70 IP (CASRN1406-66-2) from VITABLEND NEDERLAND BV; gallic acid ethyl ester (CASRN831-61-8) from ACROS; 3,6-dithia-1,8-octanediol (CASRN5244-34-8) from ALDRICH; Irganox™ 1035 (CASRN41484-35-9) from CIBA; ADK STAB PEP36 (CASRN80693-00-1) from PALMAROLE; calcium stearate; Tinuvin™ 292 (CASRN 41556-26-7), Tinuvin™ 400 (CASRN 192662-79-6), Tinuvin™ P (CASRN2440-22-4), Tinuvin™ 1130 (CASRN 104810-48-2) and Tinuvin™ 123 (CASRN 122586-52-1) from BASF; Irgastat™ P 18 (CASRN401844-75-5) from CIBA; 1-dibutylacetamido-mercaptotetrazole (CASRN168612-06-4) from Chemosyntha; 1-(3,4-dichlorophenyl)-1,2-dihydro-5H-tetrazole-5-thione (CASRN63684-99-1) from NOVASEP; CYASORB™ UV1164 (CASRN2725-22-6) from CYTEC INDUSTRIES BV; Tinuvin™ 400 (CASRN 192662-79-6); 2-(2,4-dihydroxyphenyl)-4,6-bis-(2,4-dimethylphenyl)-s-triazine (CASRN1668-53-7) from Capot Chemical Ltd; 4-[4,6-bis(2-methylphenoxy)-1,3,5-triazin-2-yl]-1,3-benzenediol (CASRN13413-61-1); Mixxim™ BB/100 (CASRN103597-45-1) from FAIRMOUNT; Hostavin™ 3225-2 DISP XP from CLARIANT; and other benzotriazole and benzophenone compounds.

Particularly preferred stabilizers include a phenol stabilizer sterically hindered by a ring containing three nitrogen atoms represented by Formula (Stabi-I):

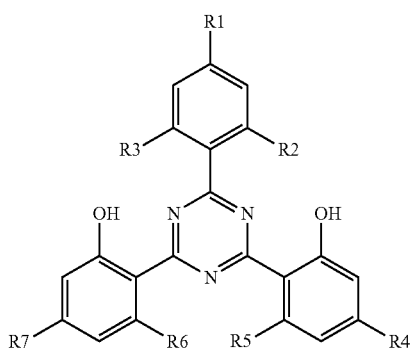

Stabi-I or Formula (Stabi-II):

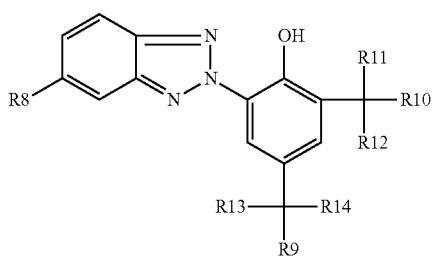

Stabi-II

Wherein
R1 to R7 is each independently selected from the group consisting of hydrogen, an alkyl group containing 1 to 12 carbon atoms and an alkoxy group containing 1 to 12 carbon atoms;

R8 represents hydrogen or a halogen atom;
R9 and R10 is each independently selected from the group consisting of hydrogen, an alkyl group containing 1 to 6 carbon atoms and an aryl group containing 1 to 12 carbon atoms; and
R11 to R14 is each independently selected from the group consisting of an alkyl group containing 1 to 6 carbon atoms.

In a preferred embodiment, R1 to R7 is each independently selected from the group consisting of hydrogen, an alkyl group containing 1 to 8 carbon atoms, more preferably an alkyl group containing 1 to 6 carbon atoms, and an alkoxy group containing 1 to 8 carbon atoms, more preferably an alkoxy group containing 1 to 6 carbon atoms.

In a preferred embodiment, R9 and R10 is each independently selected from the group consisting of hydrogen, an alkyl group containing 1 to 8 carbon atoms, more preferably an alkyl group containing 1 to 6 carbon atoms, and an aryl group containing 1 to 12 carbon atoms, more preferably an alkyl group containing 1 to 10 carbon atoms.

In a preferred embodiment, R5 and R6 both represent hydrogen.

In a preferred embodiment, R11 to R14 all represent methyl and preferably R9 and/or R10 represent methyl or phenyl.

In a preferred embodiment, R8 represents a chlorine atom.

In a preferred embodiment, R9 and/or R10 represent a phenyl substituted by an alkyl group or a napthyl group.

In a particularly preferred embodiment, the colour laser markable laminate includes a phenol stabilizer sterically hindered by a ring containing three nitrogen atoms and is selected from the group consisting of IS-1 to IS-4.

TABLE 5

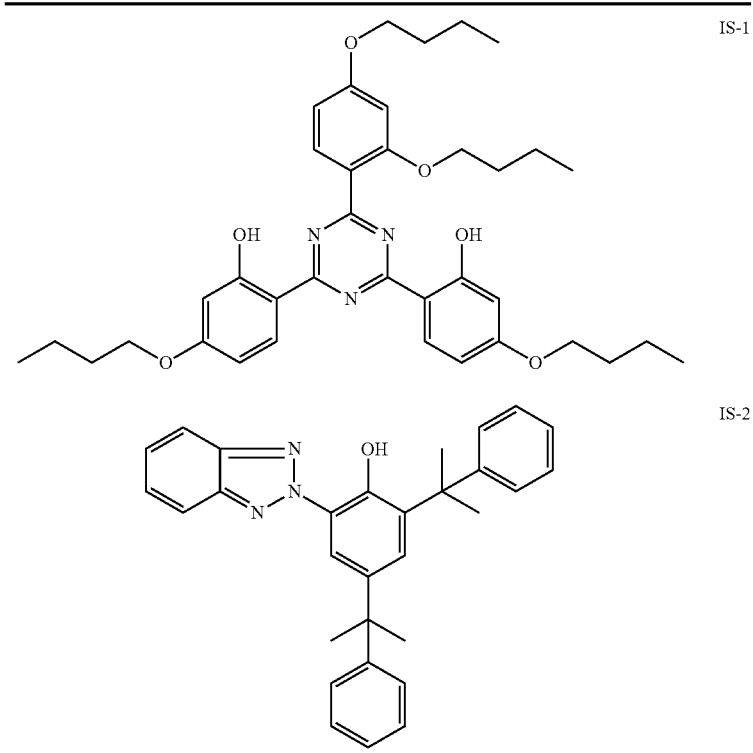

TABLE 5-continued

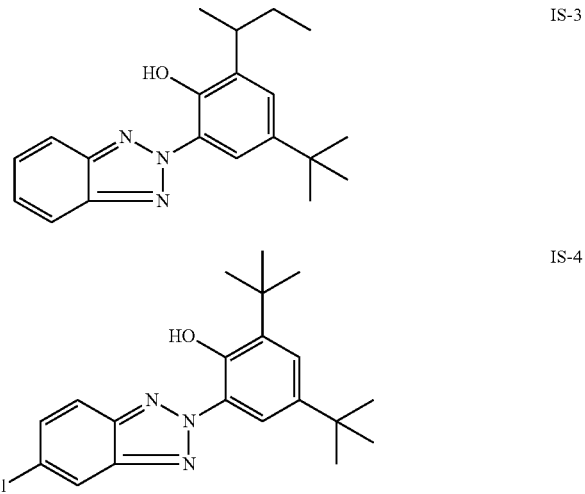

IS-3

IS-4

The stabilizer is preferably present in a colour laser markable layer, but may also be present in another layer, for example, an outer layer. An outer layer is a layer more distant from the opaque core support than the colour laser markable on the same side of the opaque core support.

Coating Solvents

For coating the colour laser markable layers, one or more organic solvents may be used. The use of an organic solvent facilitates the dissolution of the polymeric binder and specific ingredients such as the infrared dye.

A preferred organic solvent is methylethylketone (MEK) because it combines a high solubilizing power for a wide range of ingredients and it provides, on coating the colour forming layer, a good compromise between the fast drying of the layer(s) and the danger of fire or explosion thereby allowing high coating speeds.

Additives

A colour laser markable layer preferably includes at least a leuco dye, an infrared dye and a polymeric binder, but may include other ingredients.

Exemplary additives include fillers, colorants, cross-linking agents, antioxidants, security features, thickeners, surfactants, and the like. The additives are included in amounts sufficient to effect the desired properties.

Security Features

The colour laser markable laminates and articles are preferably combined with one or more security features to increase the difficulty for falsifying the document.

To prevent forgeries of identification documents, different means of securing may be used. One solution consists in superimposing lines or guilloches on an identification picture such as a photograph. Other solutions consist in adding security elements such as information printed with ink that reacts to ultraviolet radiation, micro-letters concealed in an image or text, etc.

Suitable other security features such as anti-copy patterns; guilloches; line patterns; endless text; miniprint; microprint; nanoprint; rainbow colouring; barcodes including 2D-barcodes; coloured fibres; fluorescent fibres and planchettes; fluorescent pigments including fluorescent hi-lites; OVD (Optically Variable Device) and DOVID (Diffractive Optically Variable Image Device) such as holograms, 2D and 3D holograms, holograms with kinematic effects like Kinegrams™; overprint; relief embossing; perforations; metallic pigments; magnetic material; metameric colours; microchips such as RFID chips; images made with OVI (Optically Variable Ink) such as iridescent and photochromic ink; images made with thermochromic ink; phosphorescent pigments and dyes; watermarks including single tone, duotone and multitone watermarks; ghost images and security threads.

In a preferred embodiment, the colour laser markable article includes a security feature selected from the group consisting of anti-copy patterns, guilloches, line patterns, endless text, miniprint, microprint, nanoprint, rainbow colouring, barcodes, coloured fibres, fluorescent fibres and planchettes, fluorescent pigments, holograms, overprint, relief embossing, perforations, metallic pigments, magnetic material, metameric colours, microchips, images made with iridescent, photochromic or thermochromic ink, phosphorescent pigments and dyes, watermarks, ghost images and security threads.

Methods of Manufacturing Colour Laser Markable Articles

A preferred method of manufacturing a colour laser markable article includes the steps of: a) assembling, in order, an outer laminate including a transparent polymeric support having on one side of the support a colour laser markable layer containing an infrared dye having an absorption maximum in the infrared region $\lambda_{max}$(IR-3); an adhesive foil; an inner laminate including a transparent polymeric support having on one side of the transparent polymeric support a colour laser markable layer containing an infrared dye having an absorption maximum in the infrared region $\lambda_{max}$(IR-2) and on the opposite side of the transparent polymeric support a colour laser markable layer containing an infrared dye having an absorption maximum in the infrared region $\lambda_{max}$(IR-1); and an opaque core support; and b) fusing the assembly by hot lamination, preferably simultaneous hot lamination; wherein the colour laser markable layers containing the infrared dyes having an absorption maximum in the infrared region $\lambda_{max}$(IR-3) and $\lambda_{max}$(IR-2) are facing each other. More preferably also the conditions a) and b) are fulfilled: a) $\lambda_{max}$(IR-1)>$\lambda_{max}$(IR-2)>$\lambda_{max}$(IR-3); b) $\lambda_{max}$(IR-1)>1100 nm and $\lambda_{max}$(IR-3)<1000 nm; and most preferably also the condition c) is fulfilled: c) $\lambda_{max}$(IR-2) differs by at least 70 nm from $\lambda_{max}$(IR-1) and $\lambda_{max}$(IR-3).

In a preferred embodiment of the method of manufacturing a colour laser markable article, the adhesive foil includes one or more security features.

In one preferred embodiment of the method of manufacturing a colour laser markable article, the security feature is applied directly on one or more colour laser markable layers, more preferably on the colour laser markable layer having the infrared dye with the absorption maximum in the infrared region $\lambda_{max}$(IR-3) or $\lambda_{max}$(IR-2). The security feature applied directly on a colour laser markable layer is preferably one that requires no heat for its realization. The security feature can e.g. be an inkjet ink printed containing a UV fluorescent pigment wherein the inkjet is cured by UV radiation.

Laser Marking Methods

A preferred method of laser marking a colour laser markable article includes the step of laser marking a colour laser markable article with an infrared laser having an emission wavelength between 1125 nm and 1200 nm.

In a more preferred embodiment of the method of laser marking, the article is further laser marked by an infrared laser having an emission wavelength between 1040 nm and 1080 nm and/or by an infrared laser having an emission wavelength between 830 nm and 940 nm.

In a preferred embodiment of the method of laser marking a colour laser markable article, colour laser markable article in accordance with the invention includes on at least one side of an opaque core support three colour laser markable layers containing infrared dyes with an absorption maximum in the infrared region of $\lambda_{max}$(IR-1), $\lambda_{max}$(IR-2) and $\lambda_{max}$(IR-3), wherein the colour laser markable layer containing the infrared dye with an absorption maximum in the infrared region of $\lambda_{max}$(IR-3) is the outermost colour laser markable layer with reference to the opaque core support and wherein the colour laser markable layer in between and having an absorption maximum in the infrared region $\lambda_{max}$(IR-2) is facing the colour laser markable layer containing the infrared dye with an absorption maximum in the infrared region of $\lambda_{max}$(IR-3); and whereby the conditions a) and b) are fulfilled:

$\lambda_{max}$(IR-1)>$\lambda_{max}$(IR-2)>$\lambda_{max}$(IR-3);      a)

$\lambda_{max}$(IR-1)>1100 nm and $\lambda_{max}$(IR-3)<1000 nm;      b)

and more preferably also the condition c) is fulfilled:

$\lambda_{max}$(IR-2) differs by at least 70 nm from $\lambda_{max}$(IR-1) and $\lambda_{max}$(IR-3).      c)

In a preferred embodiment of the laser marking method, the colour laser markable layer is laser marked through a transparent biaxially stretched polyethylene terephthalate foil (PET-C). This PET-C foil is preferably used at least as support for the colour laser markable layer with an absorption maximum in the infrared region of $\lambda_{max}$(IR-3).

EXAMPLES

Materials

All materials used in the following examples were readily available from standard sources such as Aldrich Chemical Co. (Belgium) and Acros (Belgium) unless otherwise specified. The water used was deionized water.

CCE is Bayhydrol H 2558, a anionic polyester urethane (37.3%) from BAYER.

Resorcinol from Sumitomo Chemicals.

Par is a dimethyltrimethylolamine formaldehyde resin from Cytec industries.

PAR-sol is a 40 wt % aqueous solution of Par.

PEA is Tospearl 120 from Momentive Performance materials.

PEA-sol is a 10 wt % (50/50) aqueous/ethanol dispersion of PEA.

Dowfax™ 2A1 from Pilot Chemicals C is a Alkyldiphenyloxide disulfonate (4.5% wt %).

DOW-sol is a 2.5 wt % solution of Dowfax™ 2A1 in isopropanol.

Surfynol™ 420 from Air Products is a non ionic surfactant.

Surfynsol is a 2.5 wt % solution of Surfynol™ 420 in isopropanol.

MEK is an abbreviation used for methylethylketone.

Solvin™ 557RB is a vinylchloride-vinylacetate copolymer with 11% vinyl acetate, provided by SOLVAY.

SolvinSol is a 12.5 wt % solution of Solvin™ 557RB in MEK.

Vinnol™ H40/55 is a copolymer of 62 wt % vinyl chloride and 38 wt % of vinyl acetate provided by Wacker AG.

VinnolSol is a 12.5 wt % solution of Vinnol™ H40/55 in MEK.

HDP is the hydrogen donor-precursor CASRN 129104-70-7 prepared according to the synthesis given on page 31 of EP 605149 A (JUJO PAPER) for the compound (19).

BLD is crystal violet lactone (CASRN 1552-42-7) available from YAMADA CHEMICAL CO.

MLD is a bisindolylphthalide leuco dye (CASRN50292-95-0) available as Pergascript™ Red I6B from BASF.

YLD is 3',6'-dimethoxyfluoran (CASRN36886-76-7) available from TCI Europe NV.

IR-1Asol is a 0.15 wt % solution in MEK of the infrared dye IR-1A.

IR-1Csol is a 0.15 wt % solution in MEK of the infrared dye IR-1C.

IR-2 is a 0.15 wt % solution in MEK of the infrared dye CASRN 223717-84-8 having an absorption maximum at 1052 nm and was prepared in the same manner as disclosed by paragraphs [0150] to [0159] of EP 2463109 A (AGFA).

IR-3 was synthesized as follows via the intermediates IR-INT1 and IR-INT2:

Synthesis of IR-Absorber IR-INT1

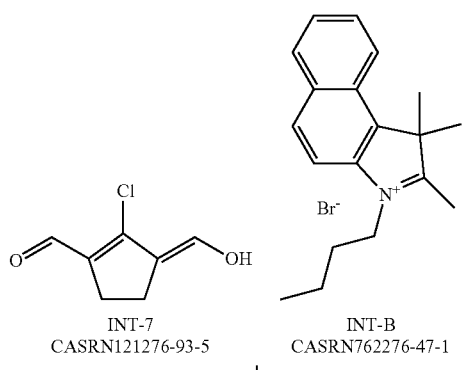

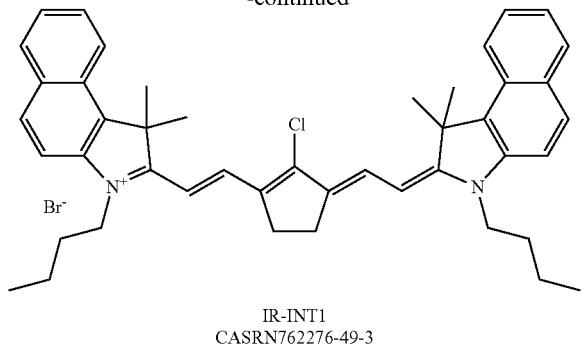

IR-INT1
CASRN762276-49-3

The synthesis of the intermediate INT-7 was performed as disclosed for infrared dye IR-1B.

The synthesis of the intermediate INT-B was performed as follows. 1 mol of 1,1,2-trimethyl-1H-benzo[e]indole (CASRN41532-84-7) and 2 mol of n-butyl bromide were stirred in 0.5 l sulfolane for four hours at 100° C. INT-B was filtered, washed with ethyl acetate and dried. The yield was 61%.

To a stirred mixture of INT-7 (4.75 g; 30 mmol) and INT-B (20.8 g; 60 mmol) in ethanol (100 mL) at room temperature were added consecutively triethylamine (12.1 g; 120 mmol) and acetic acid anhydride (12.2 g; 120 mmol). After heating to 50° C. for 1 hour, the reaction mixture was cooled to 20° C. and isopropanol (100 mL) was added. After 1 hour the precipitated IR-absorber was isolated by filtration, washed with EtOAc (20 mL) and dried in vacuo. Yield (crude) of IR-INT1 was 16 g (73%).

The absorption maximum of IR-INT1 measured in methanol was 844 nm.

Synthesis of IR-Absorber IR-INT2

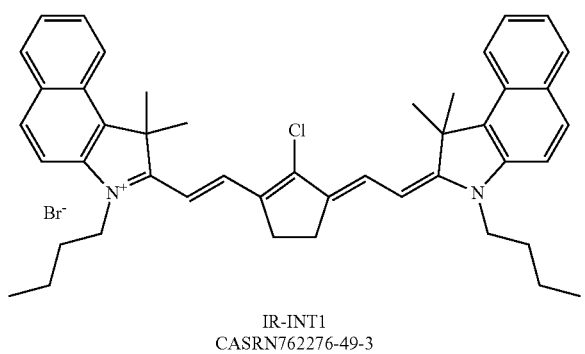

IR-INT1
CASRN762276-49-3

$CF_3(CF_2)_3SO_3^-K^+$
CASRN29420-49-3

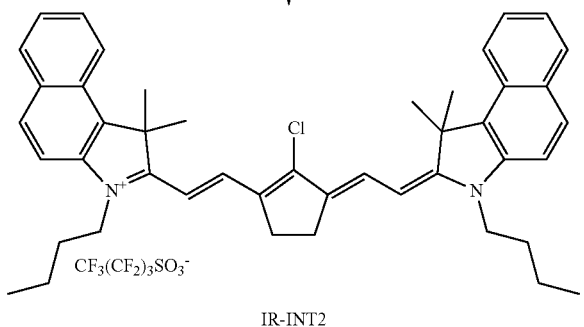

IR-INT2

To a stirred suspension of IR-INT1 (16 g; 22 mmol) in acetonitrile (200 mL) was added potassium nonafluorobutanesulfonate (CASRN29420-49-3 from TCI Europe N.V.; 8.1 g; 24 mmol) and this mixture was heated at 70° C. for 15 minutes. After cooling to room temperature, water (100 mL) was drop wise added and after stirring for 2 hours the precipitated IR-absorber was isolated by filtration, washed consecutively with a mixture of acetonitrile/water 2/1 (20 mL), methyl tert. butylether (MTBE) (20 mL) and dried in vacuo. The yield of IR-INT2 was 14 g (67%). The absorption maximum of IR-INT2 measured in methanol was 844 nm.

Synthesis of Infrared Dye IR-3

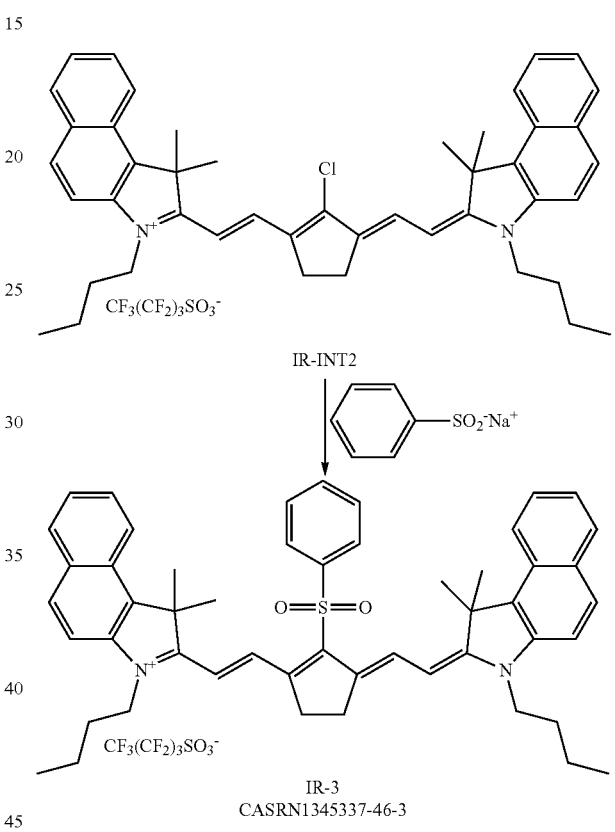

IR-3
CASRN1345337-46-3

To a stirred suspension of IR-INT2 (1.65 g; 1.73 mmol) in methanol (15 mL) under nitrogen at room temperature is added sodium benzenesulfinate (CASRN873-55-2 from Aldrich; 0.297 g; 1.81 mmol). After stirring for 2 hours the precipitated IR-absorber was isolated by filtration, washed with MTBE (5 mL) and dried in vacuo. The yield of IR-3 was 1.2 g (65%). The absorption maximum measured in methanol was 910 nm. The absorption maximum of IR-3 measured in $CH_2Cl_2$ including $6.5 \times 10^{-6}$ wt % of methanesulfonic acid was 923 nm.

IR-3sol is a 0.15 wt % solution in MEK of the infrared dye IR-3.

CORE is a 500 μm opaque PETG core available as PET-G 500 type 9311 from WOLFEN.

PETG TR is a 35 μm thick transparent PETG support available as type -PET_G transparent 35 μm from AMCOR.

PVC TR is a 25 μm thick transparent PVC support available as PVC overlay CCL280/07 from PAV CARD GmbH.

HOLO is a hot stamp hologram available on roll from OVD Kinegram AG.

Measurement Methods
1. Optical Density

The optical density was measured in reflection using a spectrodensitometer Type Macbeth TR924 using a visual filter.

2. Absorption Maximum at $\lambda_{max}$(IR) and $\lambda_{max}$(VIS) of Infrared Dyes The absorption maxima can be easily determined by absorption spectroscopy using a standard spectrophotometer capable of measuring the absorption between 300 and 1500 nm. Here a SHIMADZU UV-2101 PC spectrophotometer was used to measure the absorption maxima of an infrared dye dissolved in methylene chloride including $6.5 \times 10^{-6}$ wt % of methanesulfonic acid based on the total weight of methylenechloride. No methanesulfonic acid was used if the absorption spectrum was recorded in methanol or a solvent mixture therewith. The concentration of the infrared dye was adjusted according to the specific absorption characteristics of a dye so that an accurate measurement by the spectrophotometer was possible and not out of scale.

$\lambda_{max}$(IR) is the wavelength of the absorption maximum in the infrared spectrum from 700 to 1500 nm.

$\lambda_{max}$(VIS) is the wavelength of the absorption maximum in the visual spectrum from 400 to 700 nm.

For coated laser markable layers, the absorption between 250 nm tot 1500 nm was measured in steps of 10 nm using a PerkinElmer LAMBDA 950 UV/Vis/NIR Spectrophotometer.

3. IR/VIS

The ratio IR/VIS is determined by dividing the absorption at $\lambda_{max}$(IR) by the absorption at $\lambda_{max}$(VIS). For acceptable background discolouration the ratio IR/VIS should preferably be at least 3.5 and more preferably at least 7.0.

Example 1

This example illustrates the synthesis of infrared dyes suitable for laser marking above 1100 nm.

Synthesis of Infrared Dye IR-1A

The synthesis of IR-absorber IR-1 was carried out as described below by preparing firstly the intermediates INT-1 to INT-6.

Synthesis of Intermediate INT-1

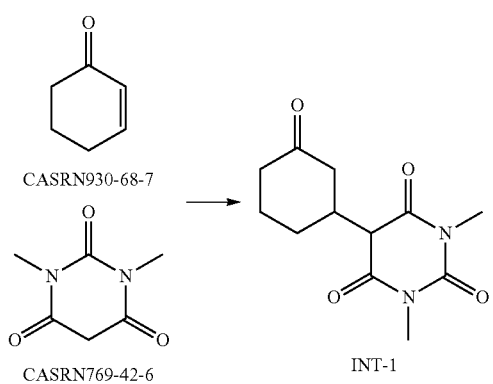

The starting materials cyclohexenone (CASRN930-68-7) and N,N-dimethyl barbituric acid (CASRN769-42-6) were commercially available compounds from TCI EUROPE N.V and Aldrich.

A mixture of cyclohexenone (48 g; 0.5 mol) and N,N-dimethyl barbituric acid (85.8 g; 0.55 mol) in water (0.5 L) was vigorously stirred at room temperature overnight. The white precipitate was filtered, digested with water (1.0 L) and dried in vacuo at 50° C. Yield of INT-1 (white powder): 111 g (88%).

Synthesis of Intermediate INT-2

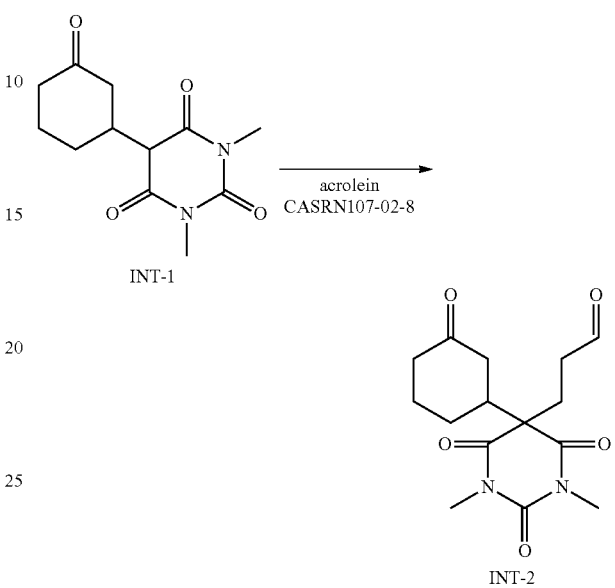

A mixture of INT-1 (37.8 g; 0.15 mol) and acrolein (containing 10% water and 0.1% hydroquinone) (14.0 g; 0.22 mol) in water (90 mL) and tetrahydrofuran (THF) (30 mL) was vigorously stirred at room temperature overnight. After addition of water (100 mL), stirring was continued for 1 hour. The white precipitate was filtered, digested with water (350 mL), filtered and dissolved in $CH_2Cl_2$ (200 mL). After washing the $CH_2Cl_2$ layer with water (30 mL) and drying over $Mg_2SO_4$ (5 g), the $CH_2Cl_2$ layer was concentrated in vacuo (rotavap). Yield of INT-2 (sticky white powder): 38 g (82%).

Synthesis of Intermediate INT-3

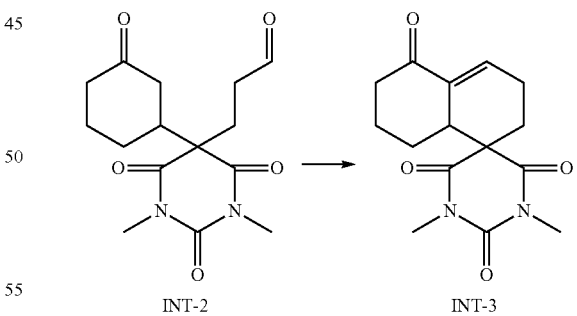

To a stirred solution of INT-2 (37 g; 0.12 mol) in $CH_2Cl_2$ (550 mL) was added a solution of methanesulfonic acid (5.76 g) in tetrahydrofuran (THF) (120 mL) at room temperature. After stirring for 24 hours, the mixture was consecutively extracted with a solution of $NaHCO_3$ (20 g) in water (200 mL), a solution of $NaHCO_3$ (7 g) in water (200 mL) and a solution of NaCl (10 g) in water (200 mL). After drying over $Mg_2SO_4$ (5 g), the organic layer was concentrated in vacuo (rotavap). Yield of INT-3 (sticky white powder): 30 g (85%).

Synthesis of Intermediates INT-4 (In-Situ) and INT-5 and INT-5'

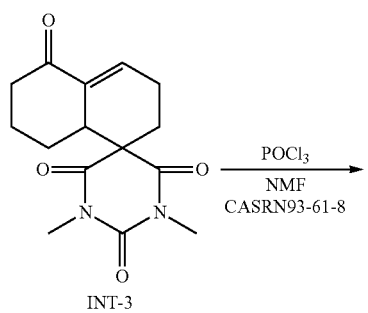

INT-3

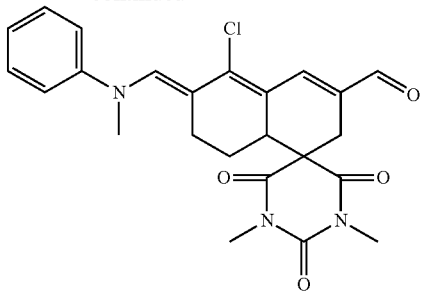

INT-5'

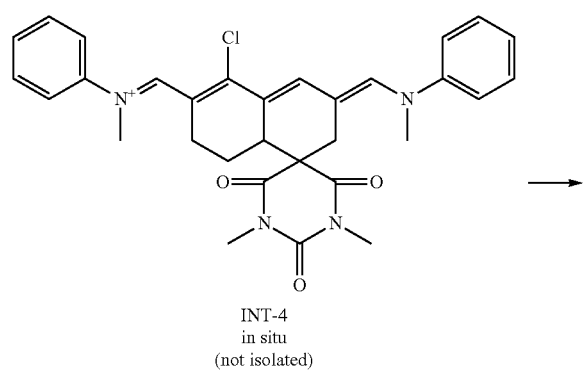

INT-4
in situ
(not isolated)

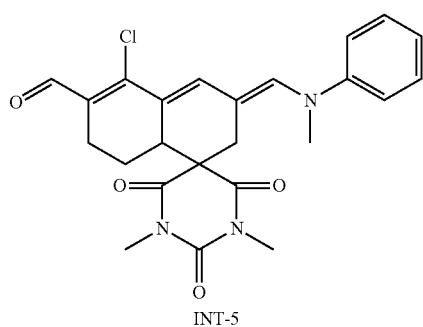

INT-5

To a stirred solution of NMF (4.06 g; 0.03 mol) in methylacetate (40 mL) was added POCl$_3$ (6.9 g; 0.045 mmol) at 0° C. After stirring for 15 minutes, INT-3 (4.1 g; 0.014 mol) was added in small portions over a 15 minute period and then this mixture was heated to reflux (bath temperature 90° C.) for 2 hours. After cooling on an ice bath, the blue coloured solution (containing INT-4) was poured into a cooled, well stirred solution of NaHCO$_3$ 0.3 aq (30.5 g) in water (50 mL). After gradual warming the mixture to room temperature over a 1 hour period, the organic phase was separated, washed with saturated NaCl in water (10 mL), dried over Mg$_2$SO$_4$ (5 g) and concentrated (viscous dark oil, ca. 10 g). After redissolving this oil in a mixture of acetic acid (42 mL) and methanol (142 mL), water (210 mL) was added while vigorously stirring. The formed red-brown precipitate was collected by filtration, digested with water (50 mL), filtered and dried in vacuo in the presence of solid KOH. Yield of red-brown powder: 2.59 g (41%). The absorption maximum (in methanol) was found to be 443 nm.

According to LC-MS analysis, the product was mainly a mixture of 2 isomers (ratio: +/−15:1) of INT-5 and INT-5' (or vice versa). Since this is inconsequential for the synthesis of IR-1A, the mixture was used directly in the next step.

Synthesis of Intermediate INT-6 and IR-1A

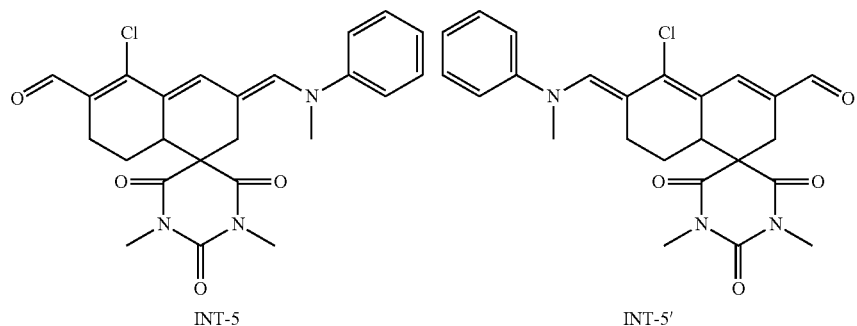

INT-5                    INT-5'

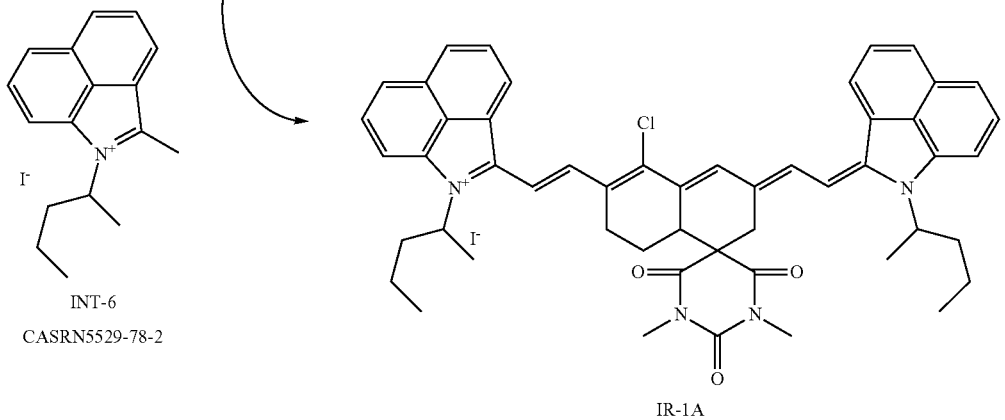

The synthesis of intermediate INT-6 was performed as disclosed in [0157] of EP 2463109 A (AGFA).

A suspension of INT-5/INT-5' (2.27 g; 5 mmol) and INT-6 (3.65 g; 10 mmol) was stirred overnight at room temperature in a mixture of methanol (25 mL) and $CH_2Cl_2$ (25 mL). The green-brown solids were isolated by filtration, digested in methanol (25 mL) for 15 minutes at room temperature, filtered and dried in vacuo. Yield of IR-1A (green-brown powder): 0.57 g (22%).

The absorption maximum of IR-1A measured in methanol was found to be 1132 nm. The absorption maximum of IR-1A measured in $CH_2Cl_2$ including $6.5\times10^{-6}$ wt % of methanesulfonic acid was 1154 nm.

Synthesis of Infrared Dye IR-1B

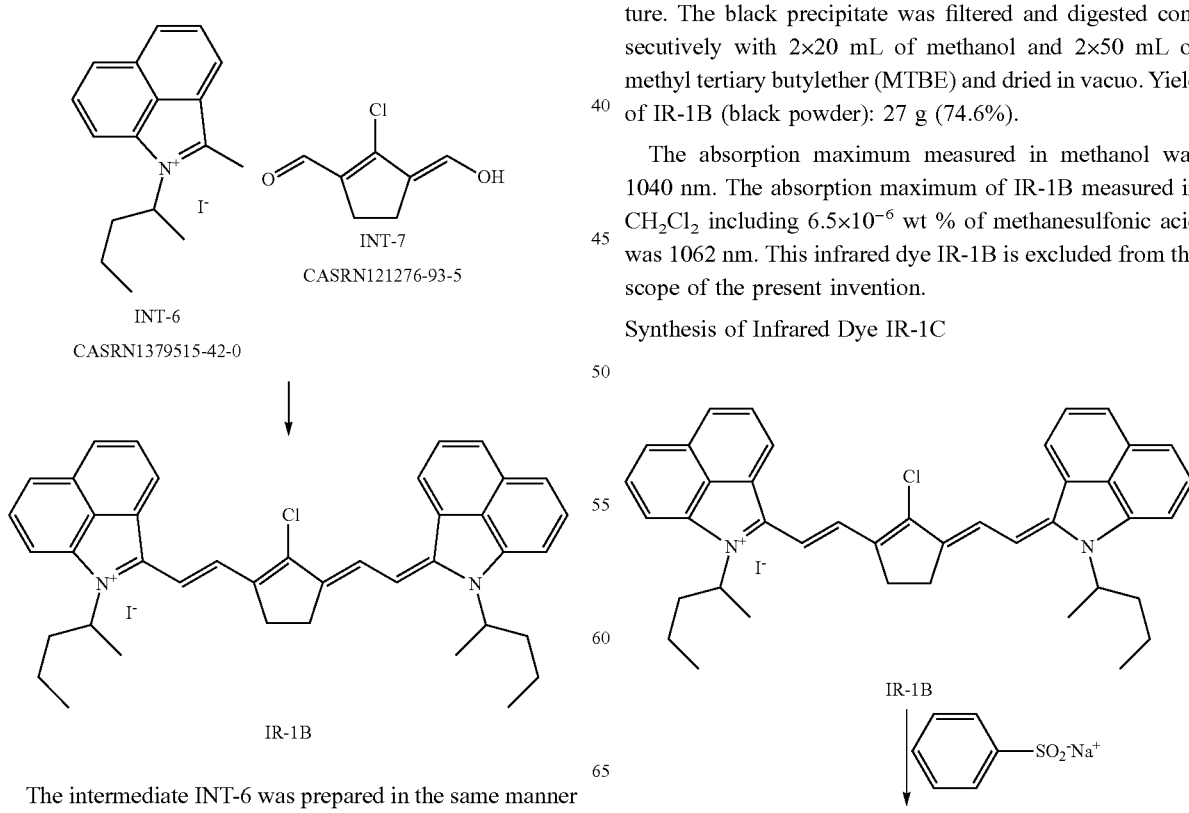

The intermediate INT-6 was prepared in the same manner as above for infrared dye IR-1A.

The synthesis of intermediate INT-7 was performed as follows. 10 mol of dimethylformamide and 3 mol phosphoryl chloride were heated up to 65° C. Then 1 mol of cyclopentanon was dropped to this mixture. After one hour of stirring at 60° C., the reaction mixture was poured into 2 l water containing 7 mol sodium acetate. INT-7 was filtered and dried. The yield was 60%.

To a stirred mixture of INT-7 containing 23% water (10.3 g; 0.05 mol) and INT-6 (36.5 g; 0.1 mol) in methanol (250 mL) was added a mixture of acetic acid (10.1 g; 0.1 mol) and triethylamine (18 g; 0.3 mol) over a 1 hour period. Stirring (under nitrogen) was continued for 1 hour at room temperature. The black precipitate was filtered and digested consecutively with 2×20 mL of methanol and 2×50 mL of methyl tertiary butylether (MTBE) and dried in vacuo. Yield of IR-1B (black powder): 27 g (74.6%).

The absorption maximum measured in methanol was 1040 nm. The absorption maximum of IR-1B measured in $CH_2Cl_2$ including $6.5\times10^{-6}$ wt % of methanesulfonic acid was 1062 nm. This infrared dye IR-1B is excluded from the scope of the present invention.

Synthesis of Infrared Dye IR-1C

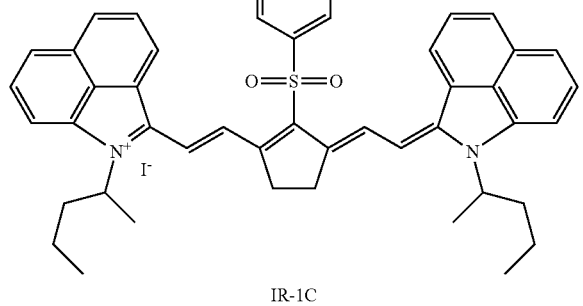

IR-1C

To a stirred suspension of IR-1B (500 mg; 0.69 mmol) in a mixture of ethanol (9 mL) and water (1 mL) at room temperature was added sodium benzenesulfonate (CASRN873-55-2; 135 mg; 0.82 mmol). After stirring for 15 minutes, the black precipitate was filtered, digested with a mixture of ethanol (4.5 mL) and water (0.5 mL) and dried in vacuo. The yield of IR-1C (black powder) was 467 mg (81%).

The absorption maximum measured in methanol was 1104 nm. The absorption maximum of IR-1C measured in $CH_2Cl_2$ including $6.5 \times 10^{-6}$ wt % of methanesulfonic acid was 1120 nm.

Synthesis of Infrared Dye IR-1D

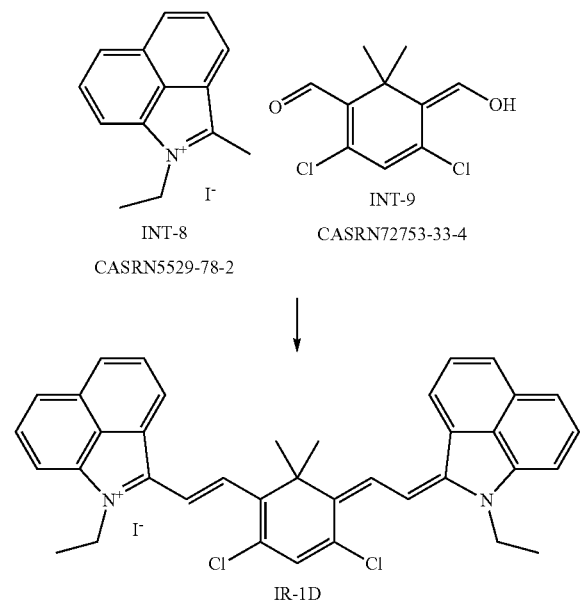

The synthesis of INT-8 was performed as in Sarmistha Halder Sinha, et al., European Journal of Medicinal Chemistry 54 (2012) 647-659.

The synthesis of INT-9 from dimedone was performed as described in Manfred Pulst, Bernd Hollborn, Manfred Weissenfels Journal f. prakt. Chemie, Band 321, Heft 4, 1979, S. 671-674

To a stirred suspension of INT-8 (81 mg; 0.25 mmol) and INT-9 (23 mg; 0.1 mmol) in a mixture of methanol (1 mL) and $CH_2Cl_2$ (1 mL) were added acetic acid (60 mg; 1.0 mmol) and indoline (25 mg; 0.2 mmol) at room temperature. After stirring over night, the precipitated IR-1D was filtered, digested consecutively with methanol (1 mL), a mixture of methanol (0.8 mL) and $CH_2Cl_2$ (0.2 mL) and dried in vacuo. The yield of IR-1D (black powder) was 10 mg (14%)

The absorption maximum measured in 1:1 mixture methanol/$CH_2Cl_2$ was found to be 1189 nm.

Example 2

This example illustrates the manufacturing and use of a set of colour laser markable laminates in accordance with a preferred embodiment of the invention. A hot stamp hologram was interlaminated between the colour laser markable inner and outer laminates in accordance with a preferred embodiment of the invention.

Preparation of PET-C Foils PET1 and PET2

A coating composition SUB-1 was prepared by mixing the components according to Table 6 using a dissolver.

TABLE 6

| wt % of components | SUB-1 |
| --- | --- |
| deionized water | 76.66 |
| CCE | 18.45 |
| Resorcinol | 0.98 |
| PAR-sol | 0.57 |
| PEA-sol | 0.68 |
| DOW-sol | 1.33 |
| Surfynsol | 1.33 |

A 1100 µm thick polyethylene terephthalate sheet was first longitudinally stretched and then coated on one side with the coating composition SUB-1 to a wet thickness of 10 µm. After drying, the longitudinally stretched and coated polyethylene terephthalate sheet was transversally stretched to produce a single side subbed 63 µm thick sheet PET1, which was transparent and glossy.

A 1100 µm thick polyethylene terephthalate sheet was first longitudinally stretched and then coated on both sides with the coating composition SUB-1 to a wet thickness of 10 µm. After drying, the longitudinally stretched and coated polyethylene terephthalate sheet was transversally stretched to produce a double side subbed 63 µm thick sheet PET2, which was transparent and glossy.

Preparation of Colour Laser Markable Inner Laminate IL1

The coating compositions BCOL1 and YCOL1 were prepared in the same way by mixing the components according to Table 7 using a dissolver.

TABLE 7

| wt % of components | BCOL1 | YCOL1 |
| --- | --- | --- |
| MEK | 16.88 | 4.11 |
| SolvinSol | 60.00 | — |
| VinSol | — | 75.00 |
| IR-2 | 20.00 | — |
| IR-1Asol | — | 18.22 |
| HDP | 1.63 | 1.63 |
| BLD | 1.50 | — |
| YLD | — | 1.04 |

The coating composition BCOL1 was coated with an Elcometer Bird Film Applicator (from ELCOMETER INSTRUMENTS) on one side of the PET-C support PET2 at a coating thickness of 100 µm and subsequently dried for 2 minutes at 20° C. on the film applicator and for a further 15 minutes in an oven at 75° C.

Then the coating composition YCOL1 was coated with an Elcometer Bird Film Applicator (from ELCOMETER INSTRUMENTS) on the opposite side of the PET-C support PET2 coated with BCOL1 at a coating thickness of 100 μm and subsequently dried for 2 minutes at 20° C. on the film applicator and for a further 15 minutes in an oven at 75° C. to deliver the colour laser markable inner laminate IL1.

Preparation of Colour Laser Markable Outer Laminate OL1

The coating composition MCOL1 was prepared by mixing the components according to Table 8 using a dissolver.

TABLE 8

| wt % of components | MCOL1 |
| --- | --- |
| MEK | 0.07 |
| SolvinSol | 53.65 |
| IR-3sol | 40.7 |
| HDP | 2.13 |
| MLD | 3.45 |

The coating composition MCOL1 was coated with an Elcometer Bird Film Applicator (from ELCOMETER INSTRUMENTS) on the subbed side of the PET-C support PET1 at a coating thickness of 100 μm and subsequently dried for 2 minutes at 20° C. on the film applicator and for a further 15 minutes in an oven at 75° C. to deliver the colour laser markable outer laminate OL1.

Preparation of Colour Laser Markable Article LMA1

An assembly was made of, in order, a white opaque core support CORE, the colour laser markable inner laminate IL1, a 35 μm PETG TR foil, a hot stamp hologram HOLO, and the colour laser markable outer laminate OL1, wherein the side coated with YCOL1 of the colour laser markable inner laminate IL1 faces the white opaque core support CORE and wherein the side coated with MCOL1 of the colour laser markable outer laminate OL1 faces the hot stamp hologram HOLO.

The assembly was then laminated into a colour laser markable article LMA1 using an Oasys™ OLA6/7 plate laminator with the settings: LPT=130° C., LP=40, Hold=210 sec, HPT=130° C., HP=40 and ECT=50° C.

Evaluation and Results

The laser markable article LMA1 was then laser marked with three infrared lasers of different emission wavelength.

A first optically pumped semiconductor laser emitting at 920 nm (Genesis MX 920-4000 MTM from COHERENT) was used for producing a magenta coloured wedge of 1 cm×1 cm square boxes of increasing optical density up to a maximum optical density of 1.02 in the laser markable layer coated from MCOL1. The laser was used at a power level of 4.5 W (29.5 A), a dither of 0.025, a scan speed of 100 mm/s and at a pulse repetition rate of 1.2 kHz. The effective power was 70 to 90 mW.

A second optically pumped semiconductor laser emitting at 1064 nm (Genesis MX 1064-10000 MTM from COHERENT) was used for producing a blue coloured wedge of 1 cm×1 cm square boxes of increasing optical density up to a maximum optical density of 1.38 in the laser markable layer coated from BCOL1. The laser was used at a power level of 4.0 W (21.8 A), a dither of 0.025, a scan speed of 100 mm/s and at a pulse repetition rate of 1.2 kHz. The effective power was 60 to 85 mW.

A third optically pumped semiconductor laser emitting at 1154 nm (Genesis MX 1154-6000 MTM from COHERENT) was used for producing a yellow coloured wedge of 1 cm×1 cm square boxes of increasing optical density up to a maximum optical density of 0.55 in the laser markable layer coated from YCOL1. The laser was used at a power level of 2.25 W (19.4 A), a dither of 0.025, a scan speed of 100 mm/s and at a pulse repetition rate of 1.2 kHz. The effective power was 25 to 40 mW.

No colour contamination was observed in the different coloured wedges. This means that none of the three lasers caused any colour formation in a laser markable layer other than the one for which it was intended. For example, the 920 nm laser caused no blue respectively yellow colour formation in the laser markable layers coated from BCOL1 and YCOL1.

Figure 4:
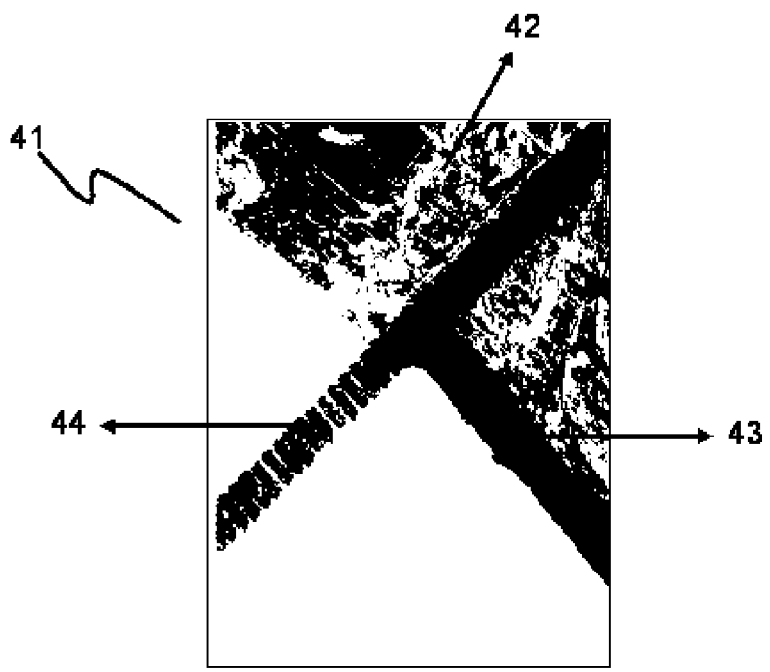
FIG. 4 shows a photograph of a colour laser markable article 41 including a hologram 42 and showing a higher optical density for a magenta laser marking 43 in an area above the hologram compared to a magenta laser marking 44 in an area next to the hologram.

The hologram gave a special, different impression due to its incorporation in the colour image. The magenta colour image on top of the hologram was of higher optical density than an area neighbouring the hologram, while the blue and yellow colour image underneath the hologram were of smaller optical density than an area neighbouring the hologram. It is believed that this effect was caused by reflections of light from the infrared lasers. FIG. 4 shows a photograph of the colour laser markable article LMA1 (41) including a hologram 42 and showing a higher optical density for a magenta laser marking 43 in an area above the hologram compared to a magenta laser marking 44 in an area next to the hologram. It can be clearly seen that the laser scan lines are still visible in the area next to the hologram.

Example 3

This example illustrates that the use of well-chosen infrared dyes, including an infrared dye IR-1C having an absorption maximum larger than 1100 nm, prevents background discolouration and colour contamination, i.e. a larger colour gamut.

Preparation of PET-C Foils PET1 and PET2

The PET-C foils PET1 and PET2 were prepared in exactly the same manner as in Example 2.

Preparation of Colour Laser Markable Inner Laminate IL2

The coating compositions BCOL2 and YCOL2 were prepared in the same way by mixing the components according to Table 9 using a dissolver.

TABLE 9

| wt % of components | BCOL2 | YCOL2 |
| --- | --- | --- |
| MEK | 27.26 | 1.95 |
| SolvinSol | 45.00 | — |
| VinSol | — | 75.00 |
| IR-2 | 24.00 | — |
| IR-1Csol | — | 20.42 |
| HDP | 1.79 | 1.63 |
| BLD | 1.95 | — |
| YLD | — | 1.00 |

The coating composition BCOL2 was coated with an Elcometer Bird Film Applicator (from ELCOMETER INSTRUMENTS) on one side of the PET-C support PET2 at a coating thickness of 100 μm and subsequently dried for 2 minutes at 20° C. on the film applicator and for a further 15 minutes in an oven at 75° C.

Then the coating composition YCOL2 was coated with an Elcometer Bird Film Applicator (from ELCOMETER INSTRUMENTS) on the opposite side of the PET-C support PET2 coated with BCOL1 at a coating thickness of 100 μm and subsequently dried for 2 minutes at 20° C. on the film applicator and for a further 15 minutes in an oven at 75° C. to deliver the colour laser markable inner laminate IL2.

Preparation of Colour Laser Markable Outer Laminate OL2

The coating composition MCOL2 was prepared by mixing the components according to Table 10 using a dissolver.

TABLE 10

| wt % of components | MCOL2 |
|---|---|
| MEK | 19.22 |
| SolvinSol | 45.00 |
| IR-3sol | 31.08 |
| HDP | 1.80 |
| MLD | 2.90 |

The coating composition MCOL2 was coated with an Elcometer Bird Film Applicator (from ELCOMETER INSTRUMENTS) on the subbed side of the PET-C support PET1 at a coating thickness of 100 μm and subsequently dried for 2 minutes at 20° C. on the film applicator and for a further 15 minutes in an oven at 75° C. to deliver the colour laser markable outer laminate OL2.

Preparation of Colour Laser Markable Article LMA2

An assembly was made of, in order, a white opaque core support CORE, the colour laser markable inner laminate IL2, a 35 μm PETG TR foil, a hot stamp hologram HOLO, and the colour laser markable outer laminate OL2, wherein the side coated with YCOL2 of the colour laser markable inner laminate IL2 faces the white opaque core support CORE.

The assembly was then laminated into a colour laser markable article LMA2 using an Oasys™ OLA6/7 plate laminator with the settings: LPT=130° C., LP=40, Hold=210 sec, HPT=130° C., HP=40 and ECT=50° C.

Evaluation and Results

The colour laser markable article LMA2 was then laser marked with three infrared lasers of different emission wavelength.

A first optically pumped semiconductor laser emitting at 920 nm (Genesis MX 920-4000 MTM from COHERENT) was used for producing a magenta coloured wedge of ten 1 cm×1 cm square boxes of increasing optical density up to a maximum optical density of 1.29 in the colour laser markable layer coated from MCOL2. The laser was used at a power level of 5.0 W, a dither of 0.025, a scan speed of 100 mm/s and at a pulse repetition rate of 1.2 kHz.

A second optically pumped semiconductor laser emitting at 1064 nm (Genesis MX 1064-10000 MTM from COHERENT) was used for producing a blue coloured wedge of ten 1 cm×1 cm square boxes of increasing optical density up to a maximum optical density of 1.15 in the colour laser markable layer coated from BCOL2. The laser was used at a power level of 5.5, a dither of 0.025, a scan speed of 100 mm/s and at a pulse repetition rate of 1.2 kHz.

A third optically pumped semiconductor laser emitting at 1154 nm (Genesis MX 1154-6000 MTM from COHERENT) was used for producing a yellow coloured wedge of ten 1 cm×1 cm square boxes of increasing optical density up to a maximum optical density of 0.56 in the colour laser markable layer coated from YCOL2. The laser was used at a power level of 5.5 W, a dither of 0.025, a scan speed of 100 mm/s and at a pulse repetition rate of 1.2 kHz.

No colour contamination was observed in the different coloured wedges. This means that none of the three lasers caused any colour formation in a laser markable layer other than the one for which it was intended. For example, the 920 nm laser caused no blue respectively yellow colour formation in the laser markable layers coated from BCOL2 and YCOL2.

Figure 3:
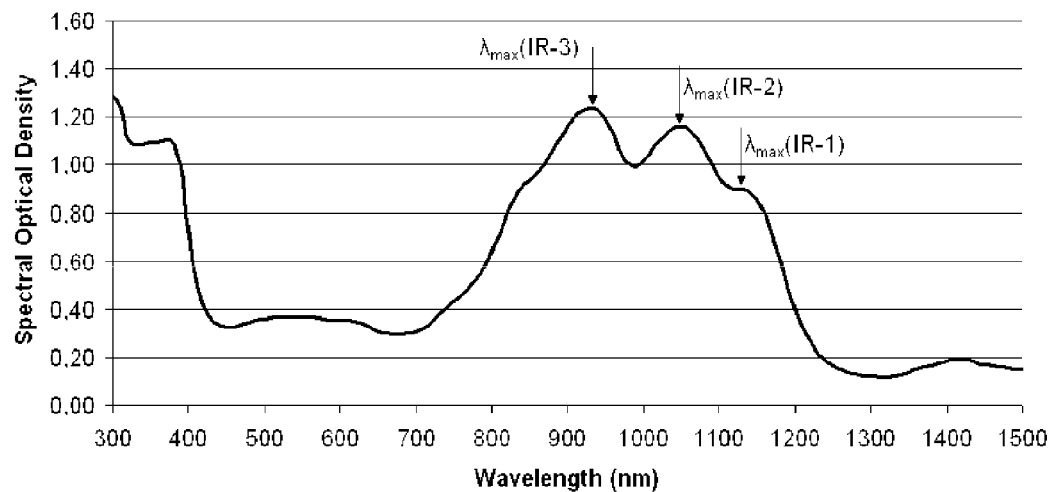
FIG. 3 shows the absorption spectrum from 300 to 1500 nm measured of the laser markable article LMA2 in Example 3.

The absorption spectrum of the colour laser markable laminate LMA2 was measured in steps of 10 nm step as shown by FIG. 3. A substantially flat absorption between 400 and 700 nm can be observed in FIG. 3, which means that there is no dominant colour discolouring the background or $D_{min}$ area of the colour laser markable laminate LMA2. A visual observation of the background shows that it is light greyish. The spectrum also shows the peaks in the infrared region of the three infrared dyes. The corresponding wavelengths for the three infrared peaks are: 930 nm for $\lambda_{max}$(IR-3), 1050 nm for $\lambda_{max}$(IR-2) and 1140 nm for $\lambda_{max}$(IR-1). Simple calculation shows that the wavelengths of maximum absorption in the infrared region of the three infrared dyes differ by at least 90 nm.

Example 4

This example illustrates the manufacturing and use of a set of colour laser markable laminates in accordance with a preferred embodiment of the invention, wherein a phosphorescent ink was printed as a security feature on an adhesive foil that was interlaminated between the laminates.

Preparation of Adhesive Foil AF-1

An inkpad was filled with a UV curable ink SICPA 360P04W.ECH UV waterless offset colourless phospho blue. A rubber stamp with the word "LASER" was pressed into the inkpad and then pressed onto a 35 μm PETG TR foil. The stamping was repeated 15 times. The foil was then cured using a Fusion DRSE-120 conveyer equipped with a Fusion VPS/I600 lamp (D-bulb) which transported the foil under the UV-lamp on a conveyer belt at a speed of 20 m/min for a UV exposure of 250 mJ/m².

Preparation of Colour Laser Markable Articles LMA3 and LMA4

Colour laser markable inner laminates IL1 and colour laser markable outer laminates OL1 were prepared in the same manner as in Example 2.

An assembly was made of, in order, a white opaque core support CORE, the colour laser markable inner laminate IL1, adhesion foil AF-1, and the colour laser markable outer laminate OL1, wherein the side coated with YCOL1 of the colour laser markable inner laminate IL1 faces the white opaque core support CORE and wherein the side coated with MCOL1 of the colour laser markable outer laminate OL1 faces the adhesive foil AF-1.

The assembly was then laminated into a colour laser markable article LMA3 using an Oasys™ OLA6/7 plate laminator with the settings: LPT=130° C., LP=40, Hold=210 sec, HPT=130° C., HP=40 and ECT=50° C.

A colour laser markable article LMA4 was prepared in exactly the same way as the colour laser markable article LMA3, except that the 35 μm PETG TR foil in the adhesive foil AF-1 was replaced by a 25 μm thick transparent polyvinylchloride support PVC TR.

Evaluation and Results

The colour laser markable articles LMA3 and LMA4 were laser marked in exactly the same manner by the three infrared lasers as described in Example 2. The maximum optical densities $D_{max}$ obtained in the colour wedges were comparable to those obtained in Example 2.

The colour laser markable article LMA3 exhibited a neutral white to greyish background, while the colour laser markable article LMA3 using an adhesive foil based on a chlorinated polymer (PVC) exhibited a pinkish background. Other colour laser markable articles made of different compositions confirmed that an adhesive foil based on a chlorinated polymer can cause undesired colour formation in a colour laser markable layer.

Concerning the security feature, it was observed that the words "LASER", applied by the rubber stamp, lit up when exposed to a UV light source.

Example 5

This example illustrates the importance of the order of the colour laser markable layers in a colour laser markable article, more particularly the importance of the order of the wavelengths of the infrared absorption maximum of the infrared dyes.

Preparation of Colour Laser Markable Articles LMA5 to LMA7

Colour laser markable inner laminates IL1 and colour laser markable outer laminates OL1 were prepared in the same manner as in Example 2.

An assembly was made of, in order, a white opaque core support CORE, the colour laser markable inner laminate IL1, a 35 μm PETG TR foil, and the colour laser markable outer laminate OL1, wherein the side coated with YCOL1 of the colour laser markable inner laminate IL1 faces the white opaque core support CORE and wherein the side coated with MCOL1 of the colour laser markable outer laminate OL1 faces the 35 μm PETG TR foil. The assembly was then laminated into a colour laser markable article LMA5 using an Oasys™ OLA6/7 plate laminator with the settings: LPT=130° C., LP=40, Hold=210 sec, HPT=130° C., HP=40 and ECT=50° C.

An assembly was made of, in order, a white opaque core support CORE, the colour laser markable inner laminate IL1, a 35 μm PETG TR foil, and the colour laser markable outer laminate OL1, wherein the side coated with BCOL1 of the colour laser markable inner laminate IL1 faces the white opaque core support CORE and wherein the side coated with MCOL1 of the colour laser markable outer laminate OL1 faces the 35 μm PETG TR foil. The assembly was then laminated into a colour laser markable article LMA6 using an Oasys™ OLA6/7 plate laminator with the settings: LPT=130° C., LP=40, Hold=210 sec, HPT=130° C., HP=40 and ECT=50° C.

An assembly was made of, in order, a white opaque core support CORE, the colour laser markable laminate OL1, the colour laser markable laminate IL1, a 35 μm PETG TR foil, wherein the side coated with MCOL1 of the colour laser markable laminate OL1 faces the white opaque core support CORE and wherein the side coated with BCOL1 of the colour laser markable laminate IL1 faces the 35 μm PETG TR foil. The assembly was then laminated into a colour laser markable article LMA7 using an Oasys™ OLA6/7 plate laminator with the settings: LPT=130° C., LP=40, Hold=210 sec, HPT=130° C., HP=40 and ECT=50° C.

The absorption maximum wavelength order of the infrared dyes in the colour laser markable articles LMA5 to LMA7 is illustrated by Table 11.

TABLE 11

| LMA5 | LMA6 | LMA7 |
| --- | --- | --- |
| Outermost surface | Outermost surface | Outermost surface |
| $\lambda_{max}$(IR-3) | $\lambda_{max}$(IR-3) | $\lambda_{max}$(IR-2) |
| $\lambda_{max}$(IR-2) | $\lambda_{max}$(IR-1) | $\lambda_{max}$(IR-1) |
| $\lambda_{max}$(IR-1) | $\lambda_{max}$(IR-2) | $\lambda_{max}$(IR-3) |
| Opaque core support | Opaque core support | Opaque core support |

Evaluation and Results

The colour laser markable articles LMA5 to LMA7 were laser marked with the three infrared lasers emitting at 920 nm, 1064 nm and 1154 nm in the same way as in Example 2.

After laser exposure, the colour of the different colour wedges produced by the three infrared lasers was visually inspected. The results are shown in Table 12.

TABLE 12

| Laser emission wavelength | Expected colour | LMA5 | LMA6 | LMA7 |
| --- | --- | --- | --- | --- |
| 920 nm | Magenta | Magenta | Magenta | Purple |
| 1064 nm | Blue | Blue | Greenish Blue | Blue |
| 1154 nm | Yellow | Yellow | Yellow | Yellow |

From Table 12, it should be clear that only the colour laser markable article LMA5 having the correct wavelength order in accordance with a preferred embodiment of the invention was capable of producing colours without colour contamination.

The colour laser markable article LMA5 was also used for exposure by combinations of two or three lasers for producing a colour wedge.

The maximum optical density $D_{max}$ of each colour wedge was measured. In addition the $D_{max}$ was also measured using a green, red or blue filter. The results are shown in Table 13.

TABLE 13

| Laser exposure | | | Perceived | Maximum Optical Density $D_{max}$ | | | |
| --- | --- | --- | --- | --- | --- | --- | --- |
| 920 nm | 1064 nm | 1154 nm | Colour at $D_{max}$ | No Filter | Green Filter | Red Filter | Blue Filter |
| Yes | No | No | Magenta | 1.19 | 2.38 | 0.53 | 0.74 |
| No | Yes | No | Blue | 1.08 | 1.01 | 1.11 | 0.70 |
| No | No | Yes | Yellow | 0.47 | 0.53 | 0.36 | 1.34 |
| Yes | Yes | No | Purple | 1.79 | 2.58 | 1.21 | 0.89 |
| Yes | No | Yes | Red | 1.21 | 2.47 | 0.52 | 1.54 |
| No | Yes | Yes | Green | 1.10 | 1.03 | 1.12 | 1.37 |
| Yes | Yes | Yes | Brown | 1.91 | 2.72 | 1.24 | 1.67 |

Table 13 shows that mixed colours can be made by using two or three of the infrared lasers. By modulation of the laser power, different shades of these mixed colours can be obtained.

A brown colour was obtained with the laser power settings of 4.5 W for the 920 nm laser, 4.0 W for the 1064 nm laser, and 2.25 W for the 1154 nm laser.

By increasing the laser power settings to 5.0 W for the 920 nm laser, 7.0 W for the 1064 nm laser, and 6.0 W for the 1154 nm laser, the maximum optical density exhibited a brownish black colour. However, for certain images a neutral black colour is preferred. It was found that a neutral black colour $D_{max}$ was obtained by using only a 1064 nm laser at a laser power of 7.8 W.

The invention claimed is:
1. A set of laminates comprising:
an outer laminate and an inner laminate; wherein
the outer laminate and the inner laminate are not assembled to each other;
the outer laminate includes a first self-supporting transparent polymeric support including, on a first side of the first self-supporting transparent polymeric support, a colour laser markable layer containing an infrared dye having an absorption maximum $\lambda_{max}(\text{IR-3})$ in the infrared region;

the inner laminate includes a second self-supporting transparent polymeric support including, on a first side of the second self-supporting transparent polymeric support, a colour laser markable layer containing an infrared dye having an absorption maximum $\lambda_{max}(\text{IR-2})$ in the infrared region, and, on a second side of the second self-supporting transparent polymeric support, a colour laser markable layer containing an infrared dye having an absorption maximum $\lambda_{max}(\text{IR-1})$ in the infrared region; and conditions a) and b) are satisfied:

$\lambda_{max}(\text{IR-1}) > \lambda_{max}(\text{IR-2}) > \lambda_{max}(\text{IR-3})$; and  a)

$\lambda_{max}(\text{IR-1}) > 1100$ nm and $\lambda_{max}(\text{IR-3}) < 1000$ nm.  b)

2. The set of laminates according to claim 1, wherein condition c) is also satisfied:

$\lambda_{max}(\text{IR-2})$ differs by at least 70 nm from $\lambda_{max}(\text{IR-1})$ and from $\lambda_{max}(\text{IR-3})$.  c)

3. The set of laminates according to claim 1, wherein $\lambda_{max}(\text{IR-3}) \geq 830$ nm.

4. The set of laminates according to claim 2, wherein $\lambda_{max}(\text{IR-3}) \geq 830$ nm.

5. The set of laminates according to claim 1, wherein $\lambda_{max}(\text{IR-1}) \geq 1125$ nm.

6. The set of laminates according to claim 3, wherein $\lambda_{max}(\text{IR-1}) \geq 1125$ nm.

7. The set of laminates according to claim 1, wherein at least the outer laminate includes a biaxially stretched polyethylene terephthalate support as the first self-supporting transparent polymeric support.

8. The set of laminates according to claim 1, wherein the colour laser markable layer of the outer laminate includes a polymeric binder including vinyl acetate and at least 85 wt % of vinyl chloride based on a total weight of the polymeric binder.

9. The set of laminates according to claim 1, wherein each of the colour laser markable layers includes a different leuco dye that forms a colour having an absorption maximum $\lambda_{max}(\text{VIS-1})$, $\lambda_{max}(\text{VIS-2})$, and $\lambda_{max}(\text{VIS-3})$, respectively, in the visible spectrum of 400 nm to 700 nm; and all relations a) to c) are satisfied:

400 nm < $\lambda_{max}(\text{VIS-1})$ < 500 nm;  a)

500 nm < $\lambda_{max}(\text{VIS-2})$ < 600 nm; and  b)

600 nm < $\lambda_{max}(\text{VIS-3})$ < 700 nm.  c)

10. A method of preparing a colour laser markable article including the set of laminates according to claim 1, the method comprising the steps of:

assembling, in order, the outer laminate, an adhesive foil, the inner laminate, and an opaque core support to form an assembly; and fusing the assembly by hot lamination; wherein the colour laser markable layers containing the infrared dyes having an absorption maximum of $\lambda_{max}(\text{IR-3})$ and $\lambda_{max}(\text{IR-2})$ face each other.

11. The method of preparing the colour laser markable article according to claim 10, wherein the adhesive foil includes a security feature.

12. The method of preparing the colour laser markable article according to claim 10, wherein the colour laser markable article includes a security feature selected from the group consisting of anti-copy patterns, guilloches, line patterns, endless text, miniprint, microprint, nanoprint, rainbow colouring, barcodes, coloured fibres, fluorescent fibres and planchettes, fluorescent pigments, holograms, overprint, relief embossing, perforations, metallic pigments, magnetic material, metamoric colours, microchips, images made with iridescent, photochromic or thermochromic ink, phosphorescent pigments and dyes, watermarks, ghost images, and security threads.

13. A method of laser marking the assembled colour laser markable article formed by the method of preparing the colour laser markable article according to claim 10, the method comprising the steps of:

providing three infrared lasers having different emission wavelengths of (Laser-1), (Laser-2), and (Laser-3), respectively; and marking the colour laser markable article with the three infrared lasers; wherein all relations a) to c) are satisfied:

820 nm < (Laser-3) < 940 nm;  a)

1020 nm < (Laser-2) < 1080 nm; and  b)

1125 nm < (Laser-1) < 1200 nm.  b)

14. The method of laser marking according to claim 13, wherein the laser emission wavelengths (Laser-1), (Laser-2), and (Laser-3) differ by at least 70 nm from each other.

* * * * *